(12) United States Patent
Schleif et al.

(10) Patent No.: US 11,691,674 B2
(45) Date of Patent: Jul. 4, 2023

(54) OFF-ROAD VEHICLE

(71) Applicant: Polaris Industries Inc., Medina, MN (US)

(72) Inventors: Andrew C. Schleif, Stacy, MN (US);
Paul W. Barton, Warwickshire (GB);
Ralph W. Lauzze, III, Hugo, MN (US)

(73) Assignee: Polaris Industries Inc., Medina, MN (US)

( * ) Notice: Subject to any disclaimer, the term of this patent is extended or adjusted under 35 U.S.C. 154(b) by 251 days.

(21) Appl. No.: 16/875,494

(22) Filed: May 15, 2020

(65) Prior Publication Data

US 2021/0354760 A1 Nov. 18, 2021

(51) Int. Cl.
| | |
|---|---|
| *B62D 21/18* | (2006.01) |
| *B60K 5/00* | (2006.01) |
| *F02B 5/00* | (2006.01) |

(52) U.S. Cl.
CPC .............. *B62D 21/183* (2013.01); *B60K 5/00* (2013.01); *F02B 5/00* (2013.01)

(58) Field of Classification Search
CPC .. B62D 21/183; B60K 5/00; B60K 2005/003; F02B 5/00; F02F 7/0058; F02F 1/045; F02F 7/0021
See application file for complete search history.

(56) References Cited

U.S. PATENT DOCUMENTS 2,525,131 A * 10/1950 Hallett .................... F02B 19/14
123/286
2,986,130 A * 5/1961 McMillan ................. F02F 1/16
123/41.82 R
(Continued)

FOREIGN PATENT DOCUMENTS

| CN | 212690200 U | * | 3/2021 |
| CN | 215292711 U | * | 12/2021 |

(Continued)

OTHER PUBLICATIONS

Suzuki; 1991 Suzuki GSX1100G Cylinder OEM Parts Diagram; retrieved Mar. 17, 2022; https://www.revzilla.com/oem/suzuki/1991-suzuki-gsx1100g/cylinder?submodel=gsx1100gp (Year: 2017).*

(Continued)

*Primary Examiner* — James A Shriver, II
*Assistant Examiner* — Michael T. Walsh
(74) *Attorney, Agent, or Firm* — Faegre Drinker Biddle & Reath LLP

(57) ABSTRACT

A utility vehicle comprising a frame, a body supported by the frame, a seating area supported by the frame, front and rear ground engaging members supporting the frame and the body, and a powertrain drivingly coupled to the front and rear ground engaging members, the powertrain including an engine having a cylinder block having a plurality of cylinders, a cylinder head removably coupled to the cylinder block, a crankcase having a first portion and a second portion, the first portion of the crankcase being removably coupled to the cylinder block, and at least one gasket positioned between the cylinder block and the first portion of the crankcase, the at least one gasket configured to individually seal each of the plurality of cylinders relative to the first portion of the crankcase.

17 Claims, 23 Drawing Sheets

(56) References Cited

U.S. PATENT DOCUMENTS

| | | | | |
|---|---|---|---|---|
| 4,708,105 A * | 11/1987 | Leydorf, Jr | ............ | F02F 7/0058 |
| | | | | 123/41.74 |
| 7,438,153 B2 | 10/2008 | Kalsnes et al. | | |
| D636,295 S | 4/2011 | Eck et al. | | |
| 8,002,061 B2 | 8/2011 | Yamamura | | |
| D650,311 S | 12/2011 | Bracy | | |
| 8,328,235 B2 | 12/2012 | Schneider et al. | | |
| 8,376,441 B2 | 2/2013 | Nakamura | | |
| 8,613,335 B2 | 12/2013 | Deckard et al. | | |
| 8,640,814 B2 * | 2/2014 | Deckard | ................ | B60N 2/38 |
| | | | | 296/205 |
| D703,102 S | 4/2014 | Eck et al. | | |
| 8,746,719 B2 | 6/2014 | Safranski et al. | | |
| D711,778 S | 8/2014 | Chun et al. | | |
| D722,538 S | 2/2015 | Song | | |
| 8,973,693 B2 | 3/2015 | Kinsman et al. | | |
| 8,997,908 B2 | 4/2015 | Kinsman et al. | | |
| 9,266,417 B2 | 2/2016 | Nadeau et al. | | |
| 9,381,803 B2 | 7/2016 | Galsworthy | | |
| 9,421,860 B2 | 8/2016 | Schuhmacher | | |
| 9,566,858 B2 | 2/2017 | Hicke et al. | | |
| 9,650,078 B2 | 5/2017 | Kinsman et al. | | |
| 9,713,976 B2 | 7/2017 | Miller et al. | | |
| 9,718,351 B2 | 8/2017 | Ripley et al. | | |
| 9,719,463 B2 * | 8/2017 | Oltmans | ................ | F02B 67/04 |
| 9,725,023 B2 | 8/2017 | Miller et al. | | |
| 9,776,481 B2 | 10/2017 | Deckard et al. | | |
| 9,856,817 B2 * | 1/2018 | Nicosia | ................ | F02F 1/004 |
| 9,908,577 B2 | 3/2018 | Novak | | |
| 10,017,090 B2 | 7/2018 | Franker et al. | | |
| 10,099,547 B2 | 10/2018 | Bessho et al. | | |
| 10,124,709 B2 | 11/2018 | Bohnsack et al. | | |
| D835,545 S | 12/2018 | Hanten et al. | | |
| 10,183,605 B2 | 1/2019 | Weber et al. | | |
| 10,189,524 B2 | 1/2019 | Schafer et al. | | |
| 10,246,153 B2 | 4/2019 | Deckard et al. | | |
| 10,300,786 B2 | 5/2019 | Nugteren et al. | | |
| D852,674 S | 7/2019 | Wilcox et al. | | |
| 10,369,861 B2 | 8/2019 | Deckard et al. | | |
| 10,479,422 B2 | 11/2019 | Hollman et al. | | |
| 10,718,238 B2 | 7/2020 | Wenger et al. | | |
| 10,800,250 B2 | 10/2020 | Nugteren et al. | | |
| 10,876,462 B1 * | 12/2020 | Draisey | ................ | F02F 1/108 |
| 10,946,736 B2 | 3/2021 | Fischer et al. | | |
| 11,173,808 B2 | 11/2021 | Swain et al. | | |
| 11,285,807 B2 | 3/2022 | Galsworthy et al. | | |
| 2003/0029413 A1 * | 2/2003 | Sachdev | ............... | F02F 7/0031 |
| | | | | 123/195 R |
| 2004/0231630 A1 | 11/2004 | Liebert | | |
| 2008/0028603 A1 * | 2/2008 | Takegawa | ............... | F02B 61/02 |
| | | | | 29/888.044 |
| 2009/0078082 A1 | 3/2009 | Poskie et al. | | |
| 2012/0073537 A1 * | 3/2012 | Oltmans | ................... | F02F 1/40 |
| | | | | 123/195 R |
| 2012/0217078 A1 | 8/2012 | Kinsman et al. | | |
| 2015/0260123 A1 * | 9/2015 | Knollmayr | ................ | F01P 3/02 |
| | | | | 123/193.3 |
| 2016/0341148 A1 | 11/2016 | Maki et al. | | |
| 2017/0152810 A1 | 6/2017 | Wicks | | |
| 2017/0175621 A1 | 6/2017 | Schenkel | | |
| 2018/0142609 A1 | 5/2018 | Seo et al. | | |
| 2018/0178677 A1 | 6/2018 | Swain et al. | | |
| 2019/0210457 A1 | 7/2019 | Galsworthy et al. | | |
| 2019/0210668 A1 | 7/2019 | Endrizzi et al. | | |
| 2019/0264635 A1 | 8/2019 | Oltmans et al. | | |
| 2020/0010125 A1 | 1/2020 | Peterson et al. | | |
| 2020/0070709 A1 | 3/2020 | Weber et al. | | |
| 2020/0346542 A1 | 11/2020 | Rasa et al. | | |
| 2021/0024007 A1 | 1/2021 | Fredrickson et al. | | |
| 2021/0088138 A1 * | 3/2021 | Yoshino | ................. | F02F 11/002 |
| 2021/0213822 A1 | 7/2021 | Ripley et al. | | |
| 2021/0354542 A1 | 11/2021 | Schleif et al. | | |

FOREIGN PATENT DOCUMENTS

| | | | | |
|---|---|---|---|---|
| DE | 202005017990 U1 * | 4/2006 | ......... | F01M 11/0004 |
| DE | 202005005999 U1 * | 9/2006 | ............. | F02B 75/32 |
| DE | 102016012781 A1 * | 4/2017 | ............... | F01M 1/02 |
| JP | 2007-083864 A | 4/2007 | | |
| JP | 2017-043130 A | 3/2017 | | |
| WO | 2013/166310 A1 | 11/2013 | | |
| WO | 2016/038591 | 3/2016 | | |
| WO | 2016/099770 A2 | 6/2016 | | |
| WO | 2016/186942 A1 | 11/2016 | | |
| WO | 2018/118176 A1 | 6/2018 | | |
| WO | 2018/118508 A2 | 6/2018 | | |
| WO | 2019/140026 A1 | 7/2019 | | |
| WO | 2020/223379 A1 | 11/2020 | | |

OTHER PUBLICATIONS

International Search Report and Written Opinion received for PCT Patent Application No. PCT/US21/31782, dated Aug. 5, 2021, 11 pages.

International Search Report and Written Opinion received for PCT Patent Application No. PCT/US21/31804, dated Aug. 9, 2021, 6 pages.

Ridenow Powersports. 2017 Can-Am Maverick X3 Walk Around. YouTube. Sep. 14, 2016 (Sep, 14, 2016). [retrieved on Jul. 6, 2021]. Retrieved from internet: <URL: https://www.youtube.com/watch?v=5IOslScF-y4> entire video. See pp. 6-8 of the ISA/237.

International Preliminary Report on Patentability as issued by the International Searching Authority, dated Nov. 15, 2022, for International Patent Application No. PCT/US2021/031782; 9 pages.

\* cited by examiner

_US 11,691,674 B2_

OFF-ROAD VEHICLE

CROSS-REFERENCE TO RELATED APPLICATIONS

The present application is co-filed with U.S. patent application Ser. No. 16/875,448 filed May 15, 2020, the complete disclosure of which is incorporated herein by reference.

FIELD OF THE INVENTION

The present invention relates to off-road vehicles including all-terrain vehicles ("ATVs") or utility vehicles ("UTVs").

BACKGROUND OF THE INVENTION

Generally, UTVs or ATVs are used to carry one or more passengers and a small amount of cargo over a variety of terrains. Current ATVs and UTVs are typically provided with engines having a unitary engine block housing a plurality of cylinders and a portion of a crankcase. However, for engine modularity purposes, a need exists for an engine in a UTV or ATV that has a cylinder block separate from but sealingly engaged with the portion of the crankcase.

SUMMARY OF THE INVENTION

In one embodiment of the disclosure, a utility vehicle comprises a frame, a body supported by the frame, a seating area supported by the frame, front and rear ground engaging members supporting the frame and the body, and a powertrain drivingly coupled to the front and rear ground engaging members. The powertrain includes an engine having a cylinder block having a plurality of cylinders, a cylinder head removably coupled to the cylinder block, and a crankcase having a first portion and a second portion. The first portion of the crankcase is removably coupled to the cylinder block, and at least one gasket is positioned between the cylinder block and the first portion of the crankcase. The at least one gasket is configured to individually seal each of the plurality of cylinders relative to the first portion of the crankcase.

In another embodiment of the disclosure, an engine for a utility vehicle comprises a cylinder block having a plurality of cylinders, a cylinder head removably coupled to the cylinder block, and a crankcase having a first portion and a second portion. The first portion of the crankcase is removably coupled to the cylinder block. Each of the plurality of cylinders is individually sealed with the first portion of the crankcase via at least one sealing member.

DETAILED DESCRIPTION OF THE DRAWINGS

Figure 1:
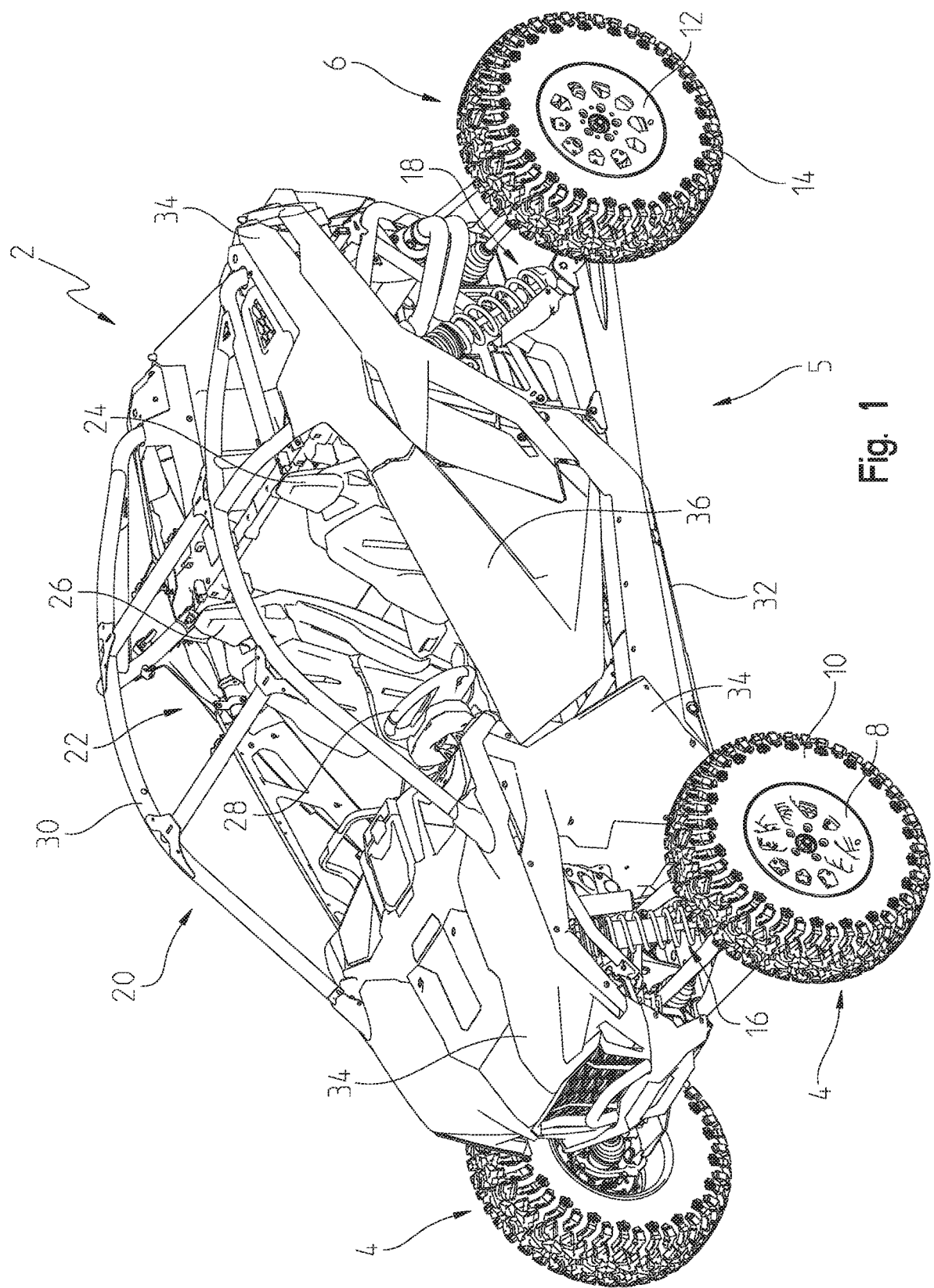
FIG. 1 shows a front left perspective view of a vehicle of the present disclosure.
Figure 2:
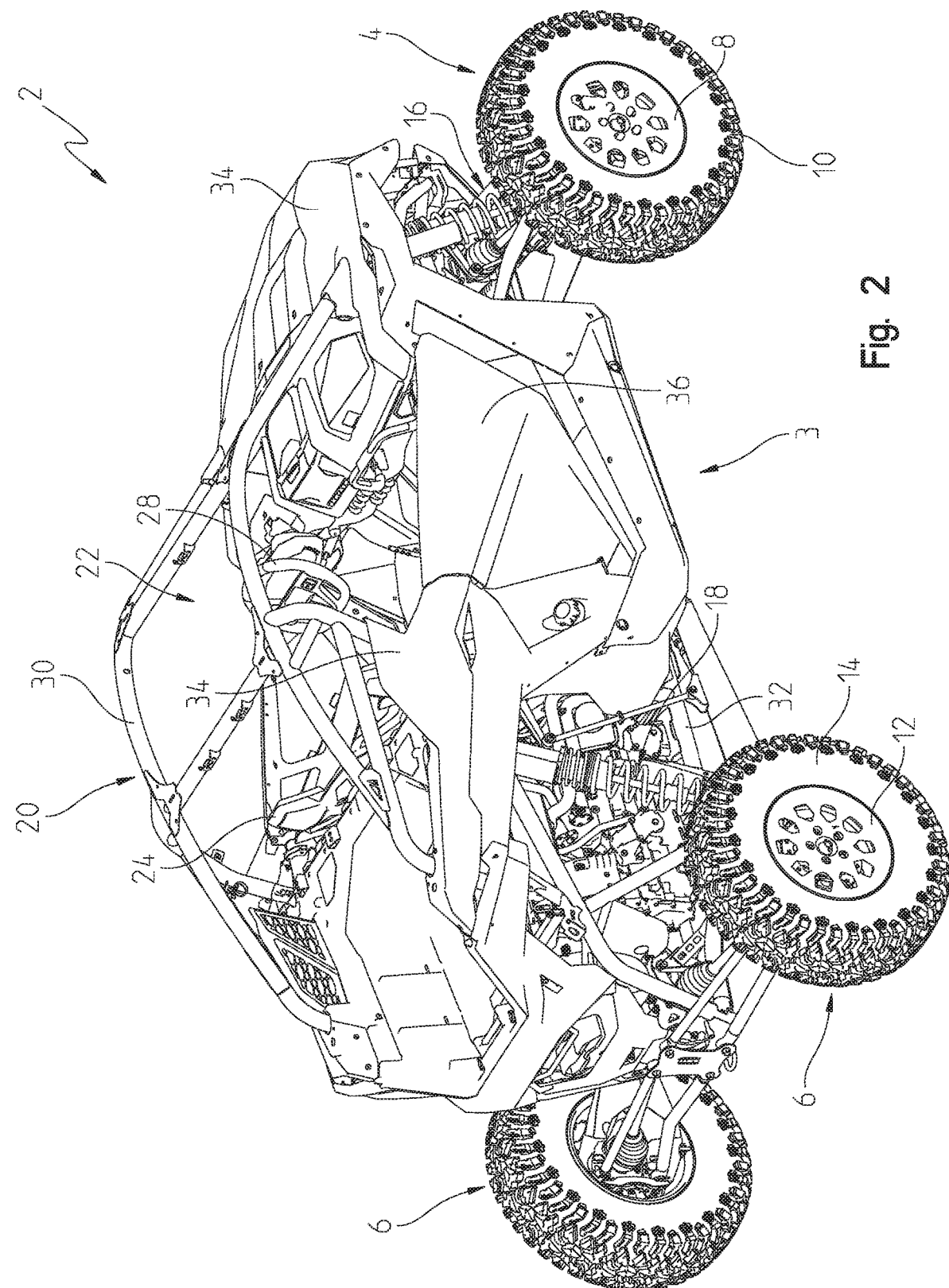
FIG. 2 shows a right rear perspective view of the vehicle of FIG. 1.
Figure 3:
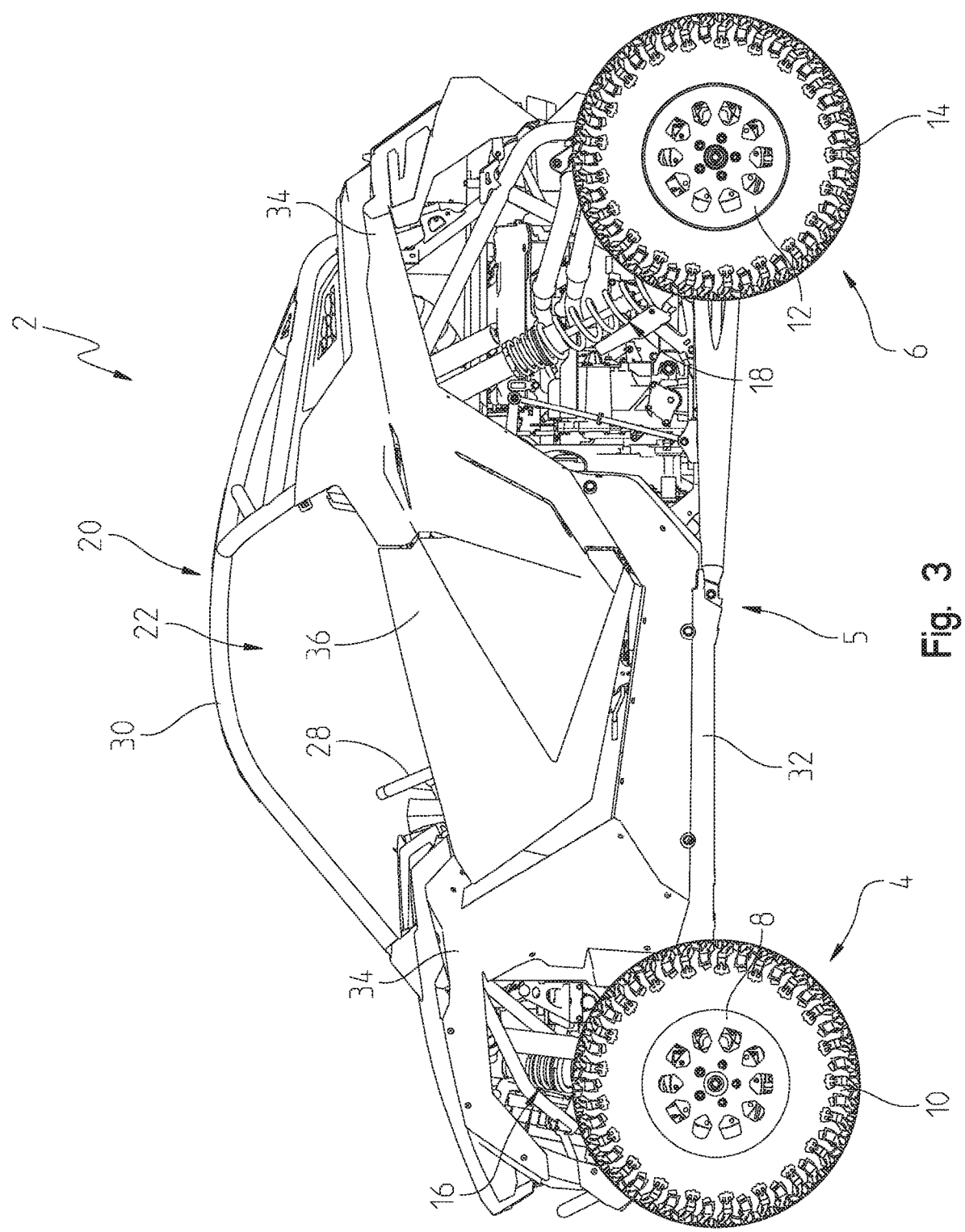
FIG. 3 shows a left elevational side view of the vehicle of FIG. 1.
Figure 4:
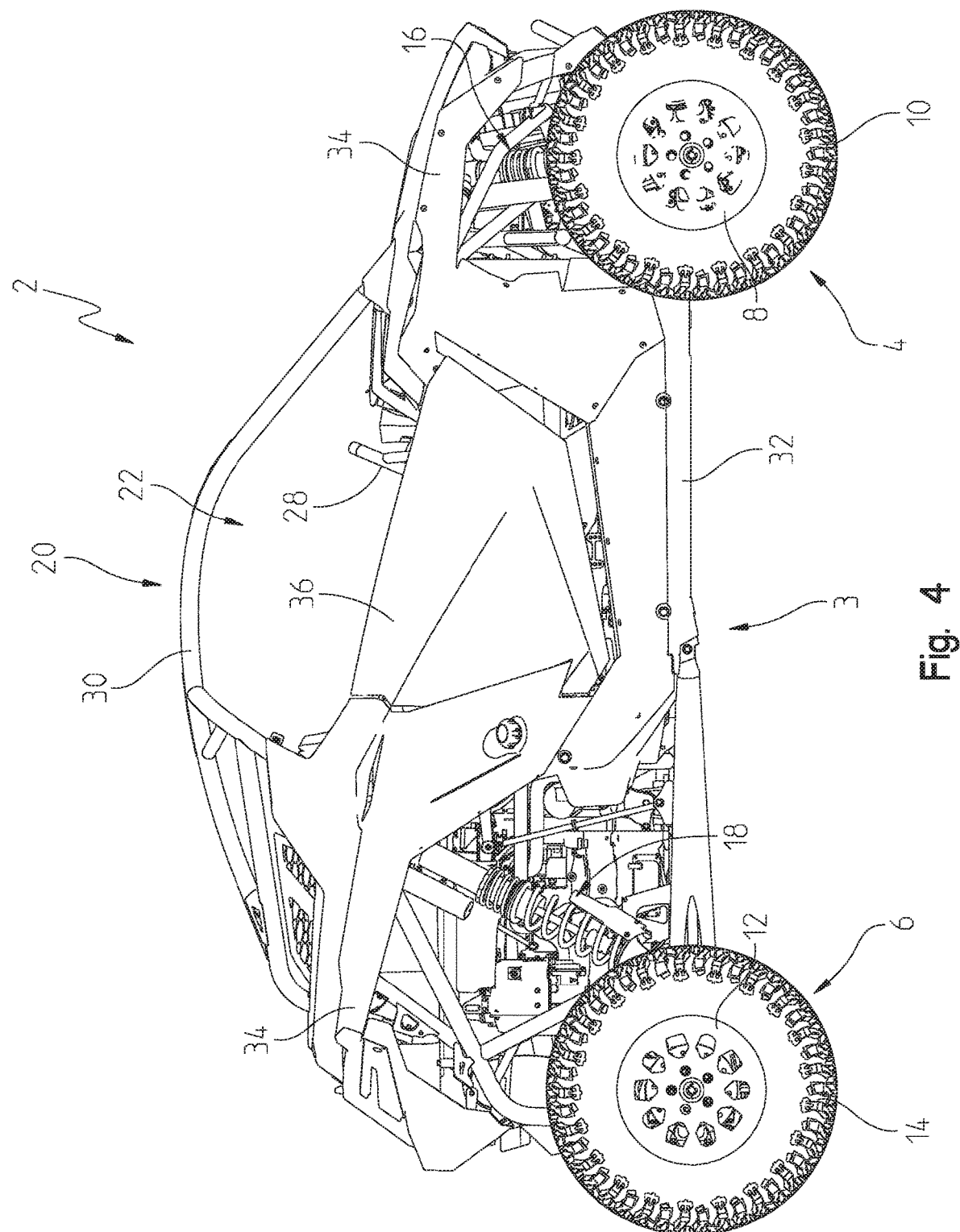
FIG. 4 shows a right elevational side view of the vehicle of FIG. 1.
Figure 5:
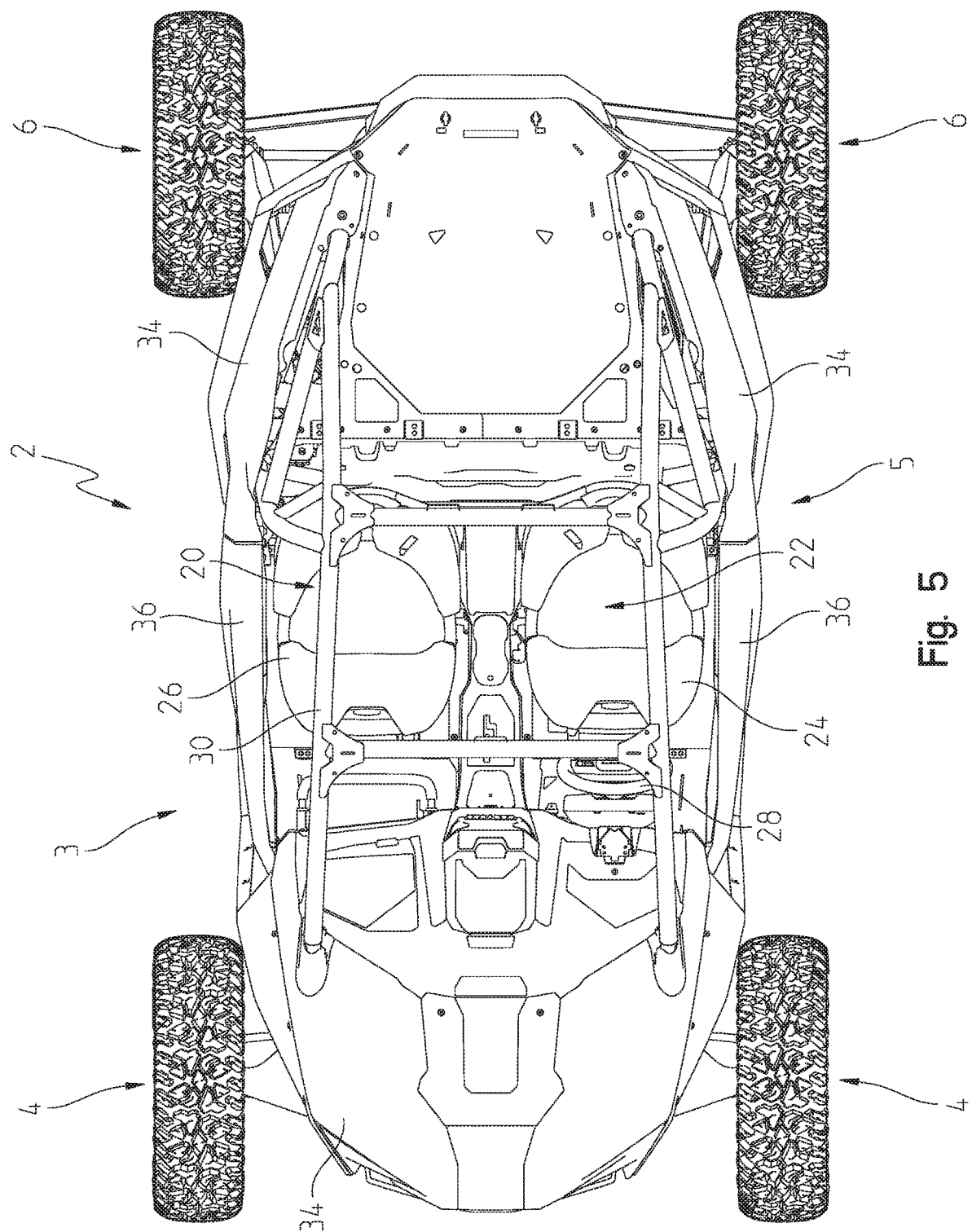
FIG. 5 shows a top plan view of the vehicle of FIG. 1.
Figure 6:
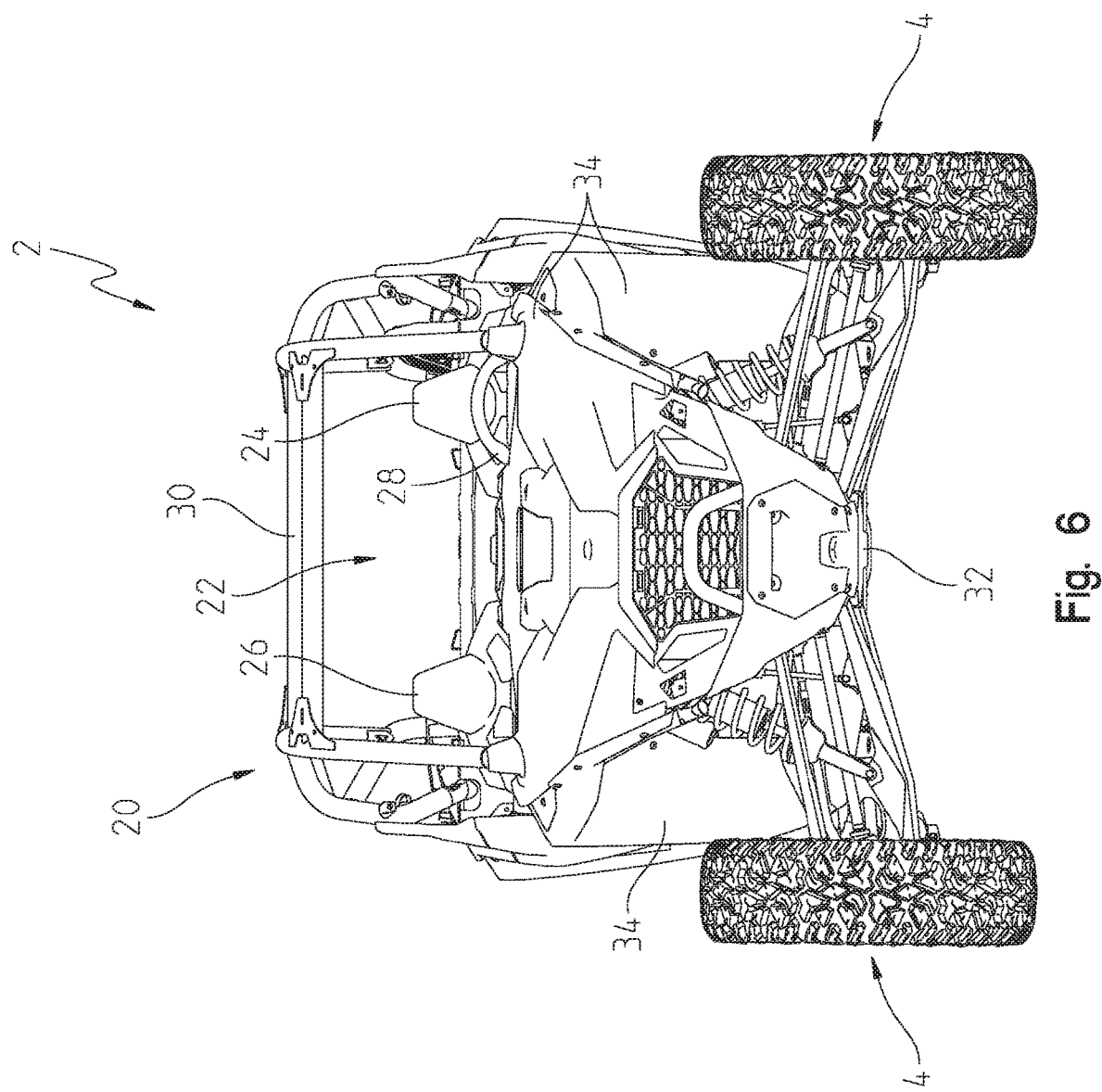
FIG. 6 shows a front elevational view of the vehicle of FIG. 1.
Figure 7:
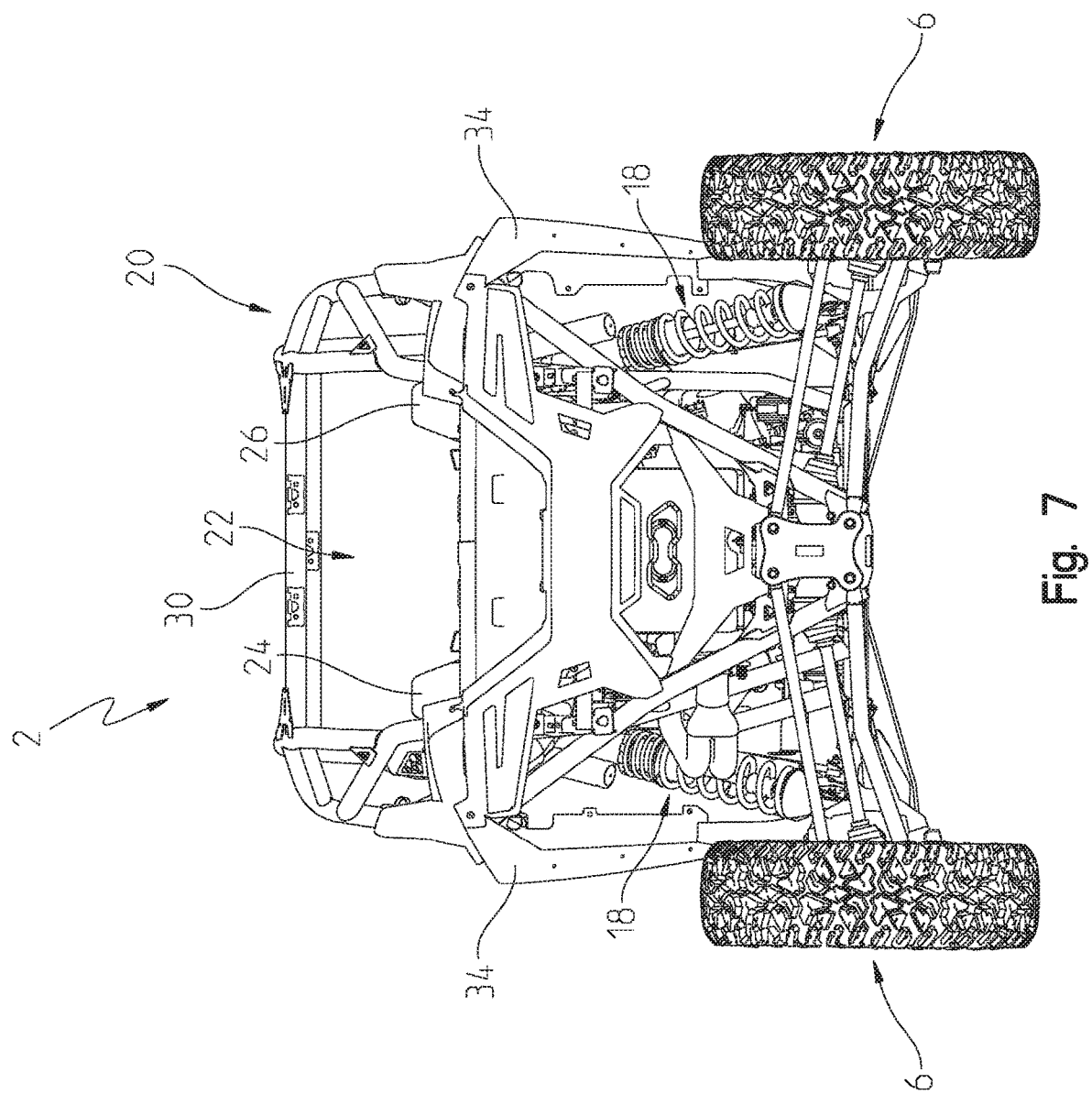
FIG. 7 shows a rear elevational view of the vehicle of FIG. 1.

With reference to FIGS. 1-7, the vehicle of the present invention will be described. As shown, the vehicle is generally depicted as reference number 2 which includes front ground engaging members 4 and rear ground engaging members 6. Front ground engaging members 4 are comprised of wheels 8 and tires 10, and rear ground engaging members 6 are comprised of wheels 12 and tires 14. Ground engaging members 4 and 6 support a vehicle frame, which is shown generally at 20, through front and rear suspension assemblies 16 and 18.

Vehicle frame 20 supports a seating area 22 comprised of a driver's seat 24 and a passenger seat 26. Vehicle 2 further includes a steering assembly for steering front ground engaging members 4 whereby the steering assembly includes a steering wheel 28. Frame 20 of vehicle 2 is comprised of a cab frame 30 that generally extends over the seating area 22, and a lower frame portion 32 positioned below and supporting cab frame 30. Frame 20 is configured to support a plurality of body panels 34 and/or doors 36.

Figure 8:
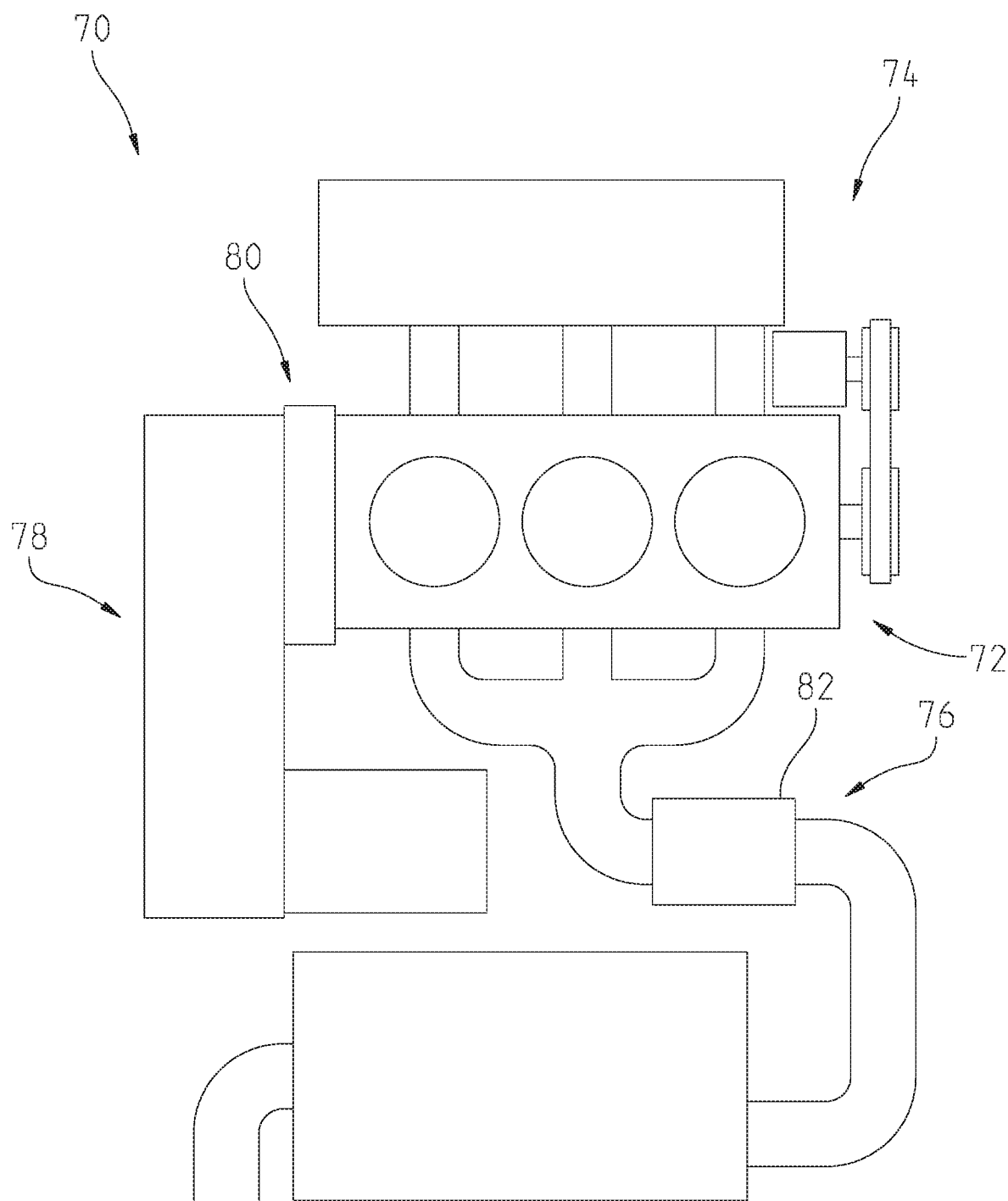
FIG. 8 shows a schematic view of a powertrain of the vehicle of FIG. 1.

With reference now to FIG. 8, vehicle 2 further includes a powertrain assembly 70 for providing power to ground engaging members 4 and 6 of vehicle 2. Powertrain assembly 70 generally comprises an engine 72, an air intake assembly 74 providing air to engine 72, an exhaust assembly 76 routing exhaust from engine 72 out of vehicle 2, a transmission 78 coupled to engine 72, and a drivetrain (not shown) coupled to transmission 78. Additional details relating to vehicle 2 including powertrain 70 may be found in U.S. patent application Ser. No. 16/875,448, filed concurrently with the present application, the subject matter of which is incorporated herein by reference. Number PLR-15-29110.01P-US), filed concurrently with the present application, the subject matter of which is incorporated herein by reference.

Still referring to FIG. 8, in various embodiments, powertrain assembly 70 may further include a starter clutch 80 removably coupled between engine 72 and transmission 78 to allow a starter motor, which may be in constant meshed engagement with starter clutch 80, to crank or start engine 72. Starter clutch 80 is generally sealingly coupled to engine 72 such that starter clutch 80 may receive lubricant from engine 72. Decoupling starter clutch 80 from engine 72 and transmission 78 allows for a more modular engine in that various components of powertrain assembly 70 may be used in different embodiments and orientations due to ability to couple and decouple components from each other, depending on the application on vehicle 2 and the requirements of powertrain assembly 70. Furthermore, in various embodiments, powertrain assembly 70 may include a turbocharger 82 at least fluidly coupled with exhaust assembly 76.

Referring now to FIGS. 9-15, engine 72 of powertrain assembly 70 generally includes a cylinder block 90, a cylinder head which includes an intake port 92 and is coupled to cylinder block 90, a first crankcase portion 94 coupled to cylinder block 90, a second crankcase portion 96 coupled to first crankcase portion 94, an oil pan 98 coupled to second crankcase portion 96, a valve or cam cover 100 depending on the location of valves and cams within engine 72 coupled over intake port 92, and a coolant assembly 102. Coolant assembly 102 may be configured to extend along a side of engine 72 from intake port 92 to second crankcase portion 94. In various embodiments, intake port 92 is positioned above cylinder block 90 and cylinder block 90 itself is positioned above first crankcase portion 94. First crankcase portion 94 is positioned above second crankcase portion 96 and second crankcase portion 96 is positioned above oil pan 98.

Figure 9:
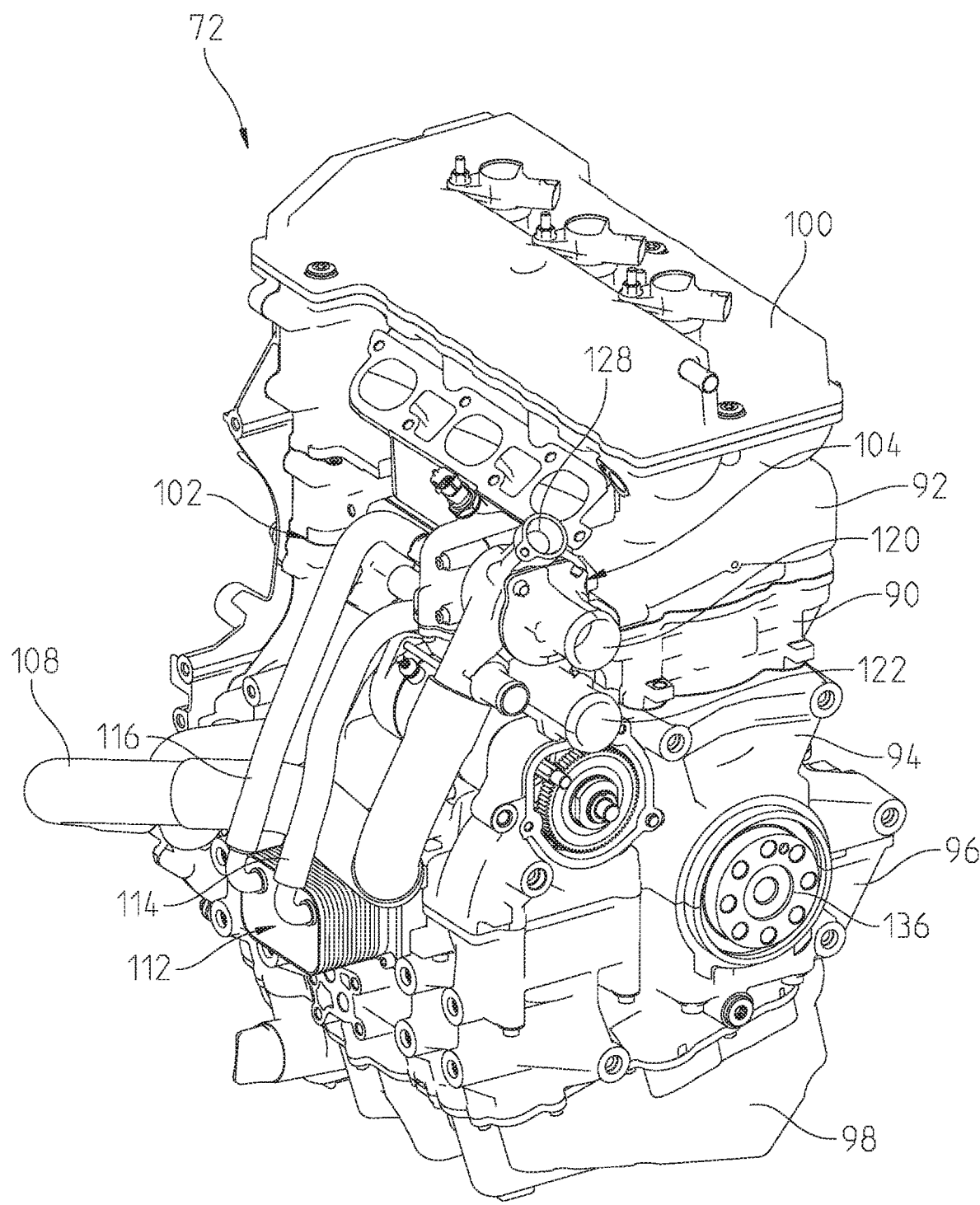
FIG. 9 shows a first perspective view of an engine of the vehicle of FIG. 1.
Figure 10:
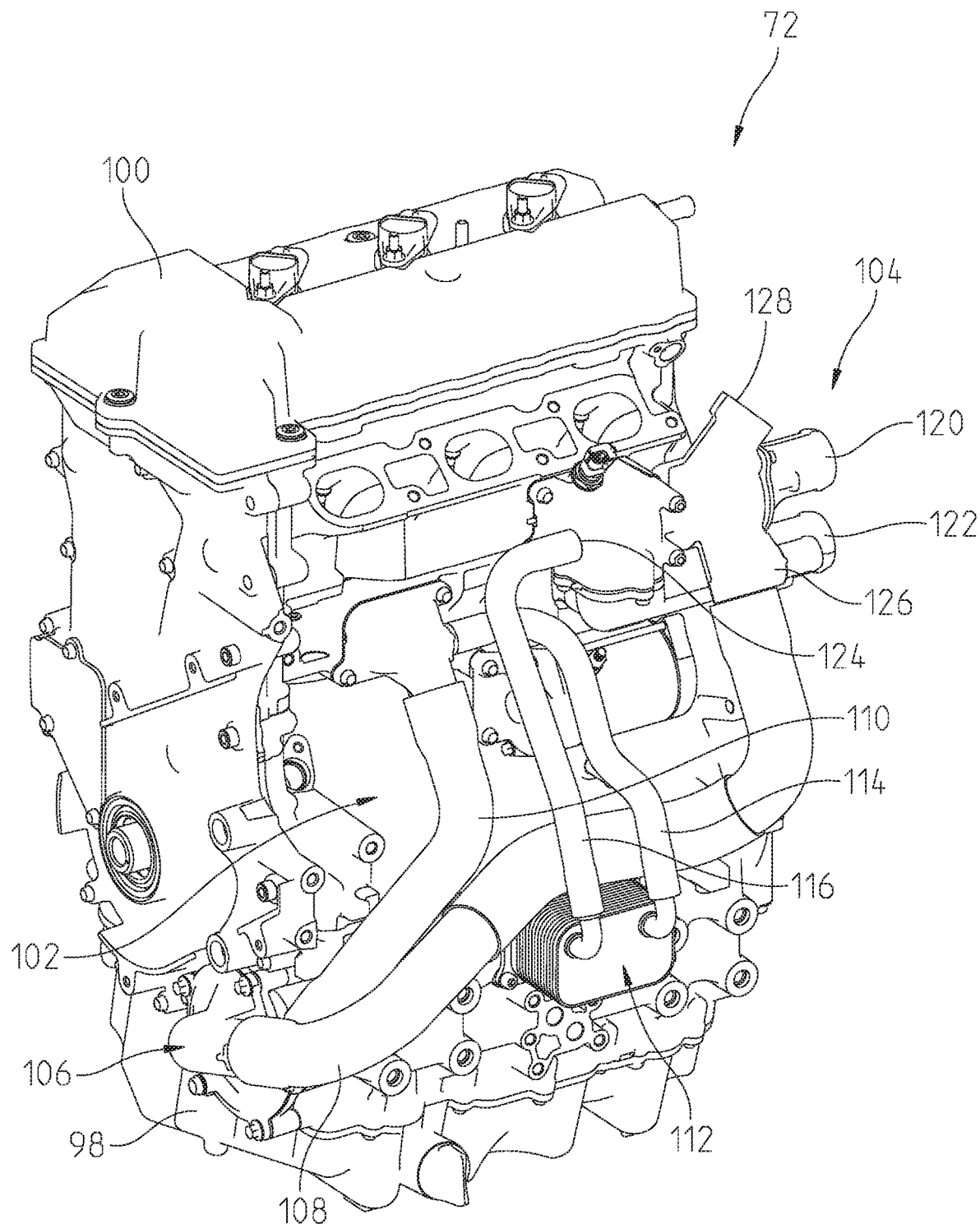
FIG. 10 shows a second perspective view of the engine of FIG. 9.

With reference to FIGS. 9 and 10, coolant assembly 102 generally includes a coolant manifold 104, a water pump 106 (FIG. 10), a water pump inlet conduit 108 coupling coolant manifold 104 to water pump 106, a water pump outlet conduit 110 (FIG. 10) coupling water pump 106 to engine 72, an oil cooler 112, an oil cooler outlet conduit 114 coupling oil cooler 112 to coolant manifold 104, and an oil cooler inlet conduit 116 coupling engine 72 to oil cooler 112. Coolant manifold 104 generally includes a first inlet 120 configured to receive coolant from a radiator (not shown), a first outlet 122 configured to provide heated coolant to the radiator, a second inlet 124 configured to receive heated coolant from oil cooler 112, a second outlet 126 configured to provide coolant to water pump 106, and a bleed outlet 128. In various embodiments, a thermostat (not shown) may be controlled with return, heated coolant from the radiator.

Figure 11:
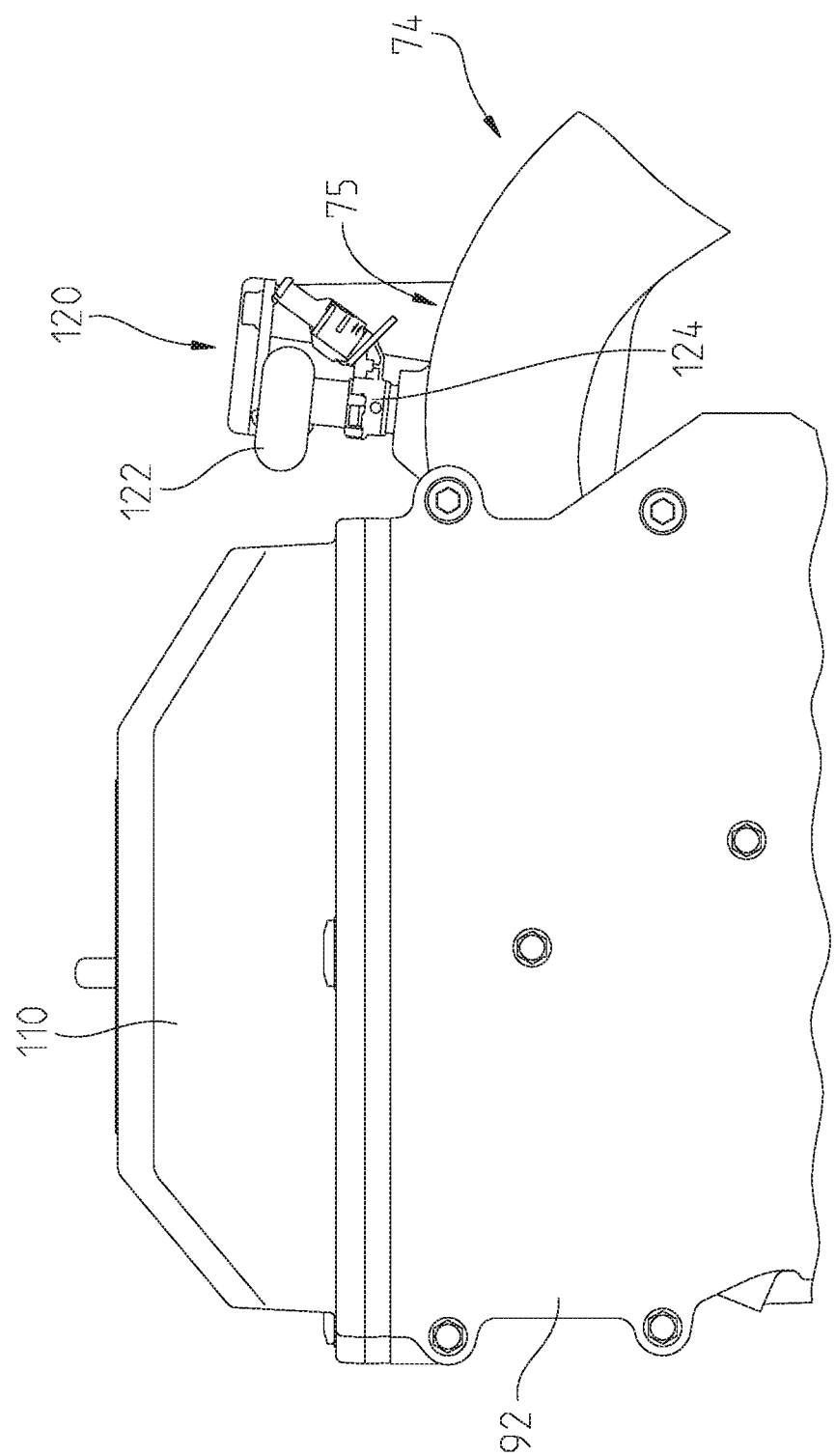
FIG. 11 shows a side plan view of a fuel injection assembly of the vehicle of FIG. 1 coupled to an air intake and an engine of a powertrain of the vehicle of FIG. 1.
Figure 12:
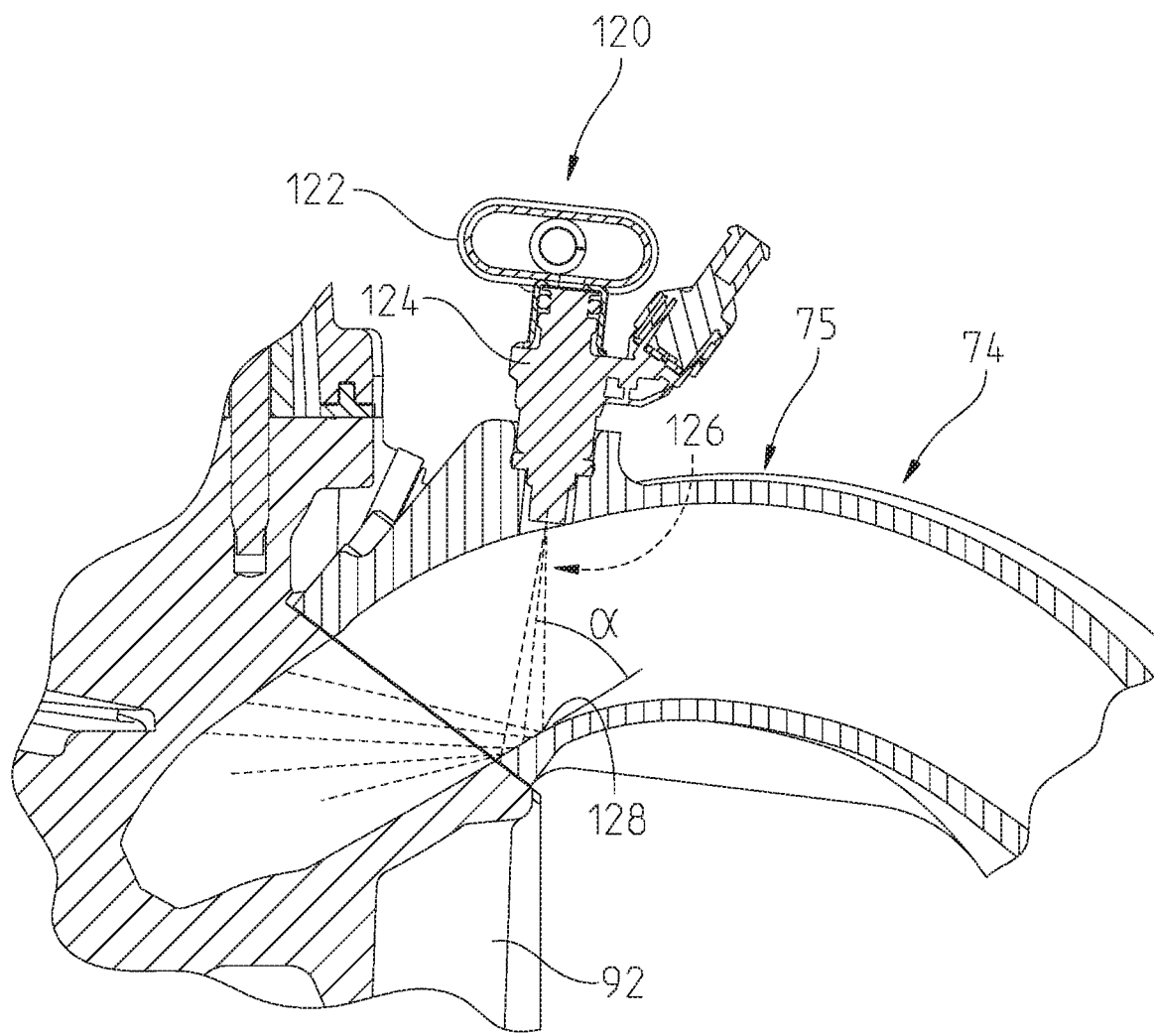
FIG. 12 shows a cross-sectional view of the fuel injection assembly, air intake, and engine of FIG. 11 taken along line 12-12 of FIG. 11.

Referring now to FIGS. 11 and 12, powertrain assembly 70 further includes a fuel injection assembly 120. Fuel injection assembly 120 generally includes a fuel rail 122 and at least one fuel injector 124. In general, fuel injector assembly 120 includes one fuel injector 124 for each cylinder 130 (FIG. 13) of engine 72. Fuel injector(s) 124 are positioned along intake assembly 74 to direct a fuel stream 126 downward such that fuel stream 126 contacts an opposing interior wall 128 of intake assembly 74 and bounces at an angle α into intake port 92. More particularly, opposing interior wall 128 is generally opposite the location of fuel injector 124 such that fuel injector 124 is positioned at one portion of an intake manifold 75 of intake assembly 74 and opposing interior wall 128 is positioned approximately 180° from the location of fuel injector 124. In various embodiments, angle α may be between 30 degrees and 70 degrees. In the illustrative embodiment, angle α is approximately 45 degrees. By hitting wall 128 substantially straight on such that fuel stream 126 defines a linear stream that first contacts wall 128 before contacting any other portion of intake manifold 75, fuel stream 126 hits wall 128 and increases the atomization of fuel stream 126. Fuel stream 126 atomizes better since the entire fuel stream 126 hits wall 128 ensuring full stream 126 atomizes rather than only a portion of fuel stream 126. In general, fuel injector assembly 120 is positioned below a top of engine 72 for protection.

Figure 13:
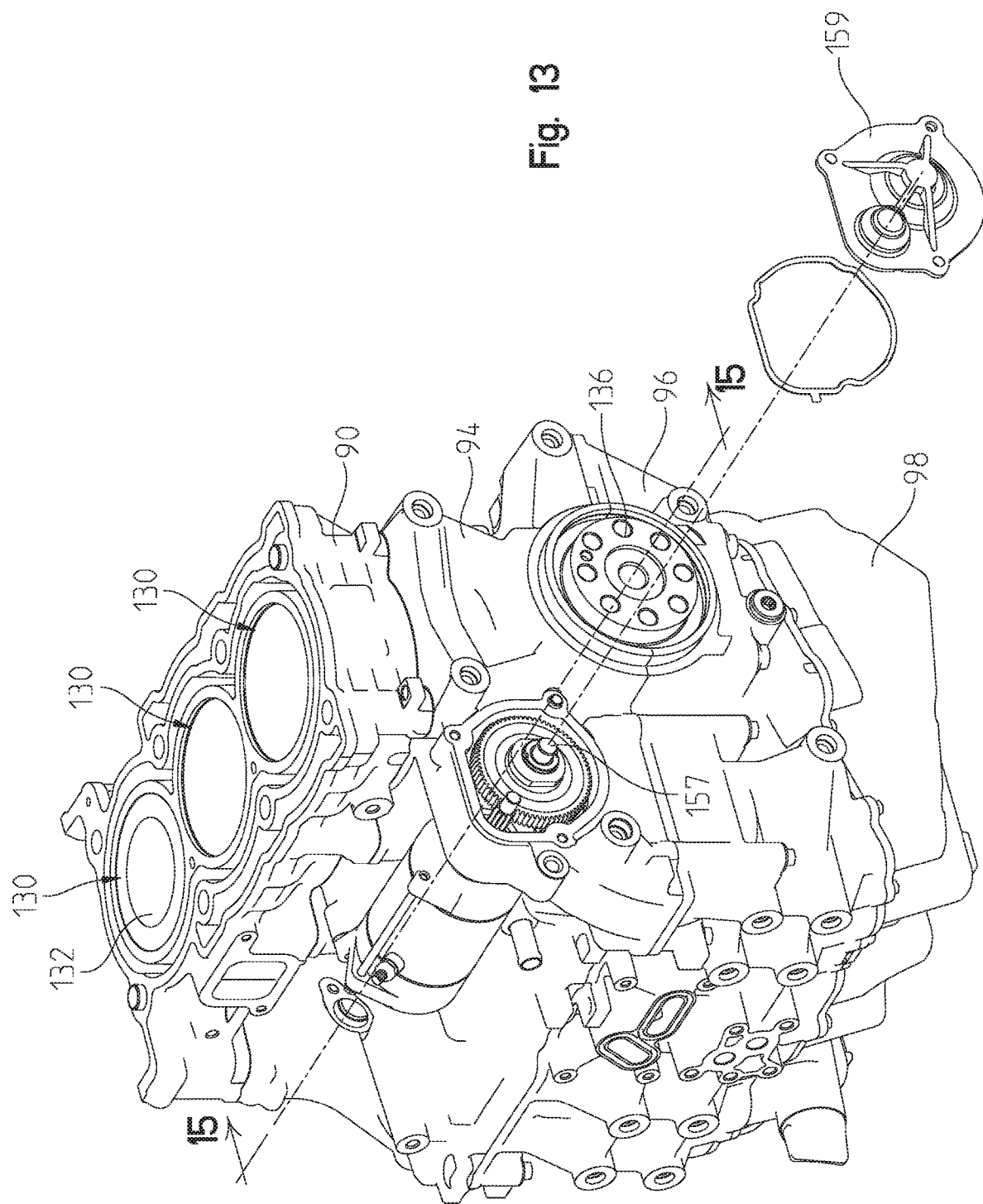
FIG. 13 shows a perspective view of the engine of FIG. 9 with a cam cover, a cylinder head, and a coolant assembly of the engine removed.
Figure 14:
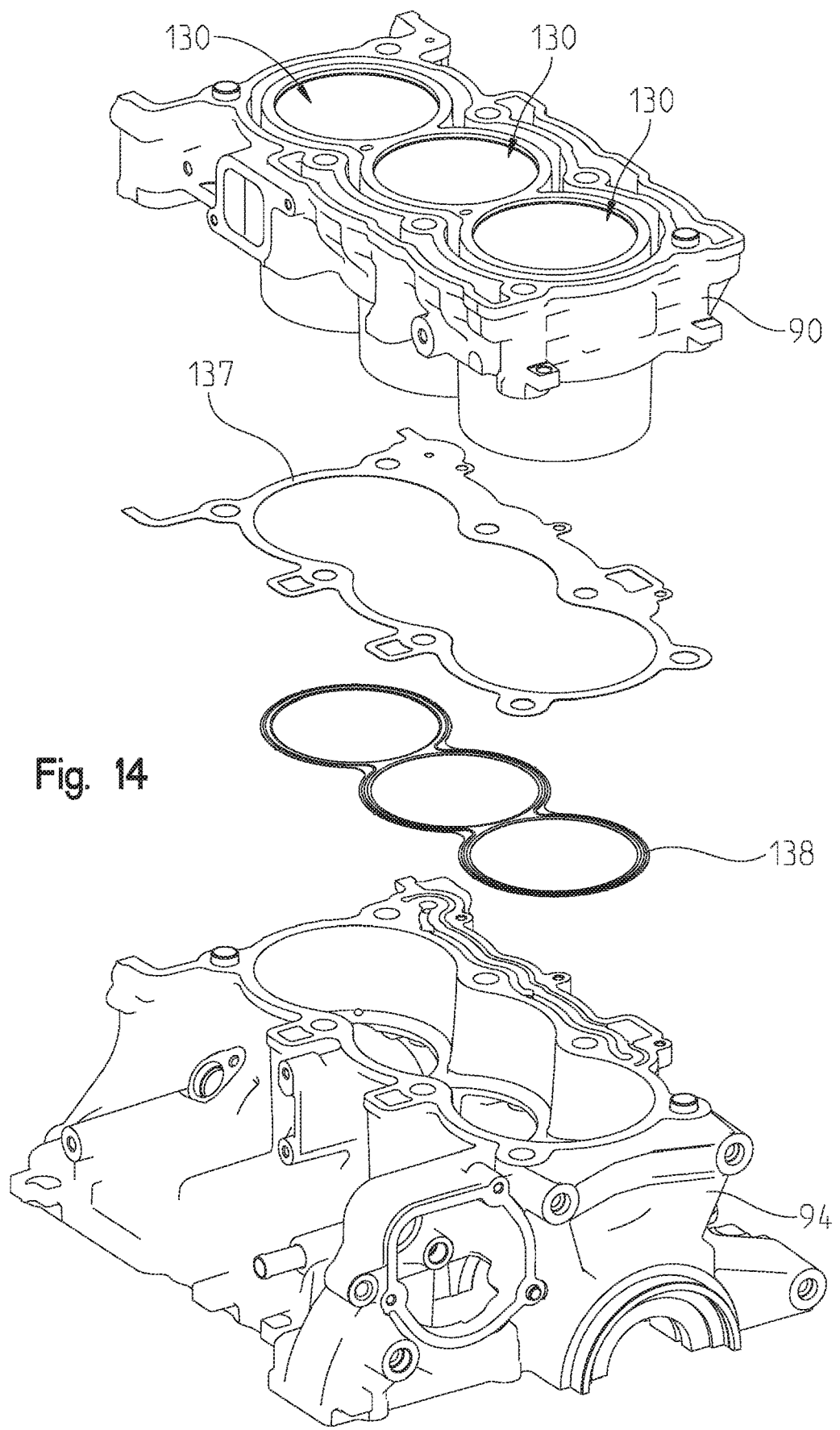
FIG. 14 shows an exploded view of a portion of the engine of FIG. 13.
Figure 15:
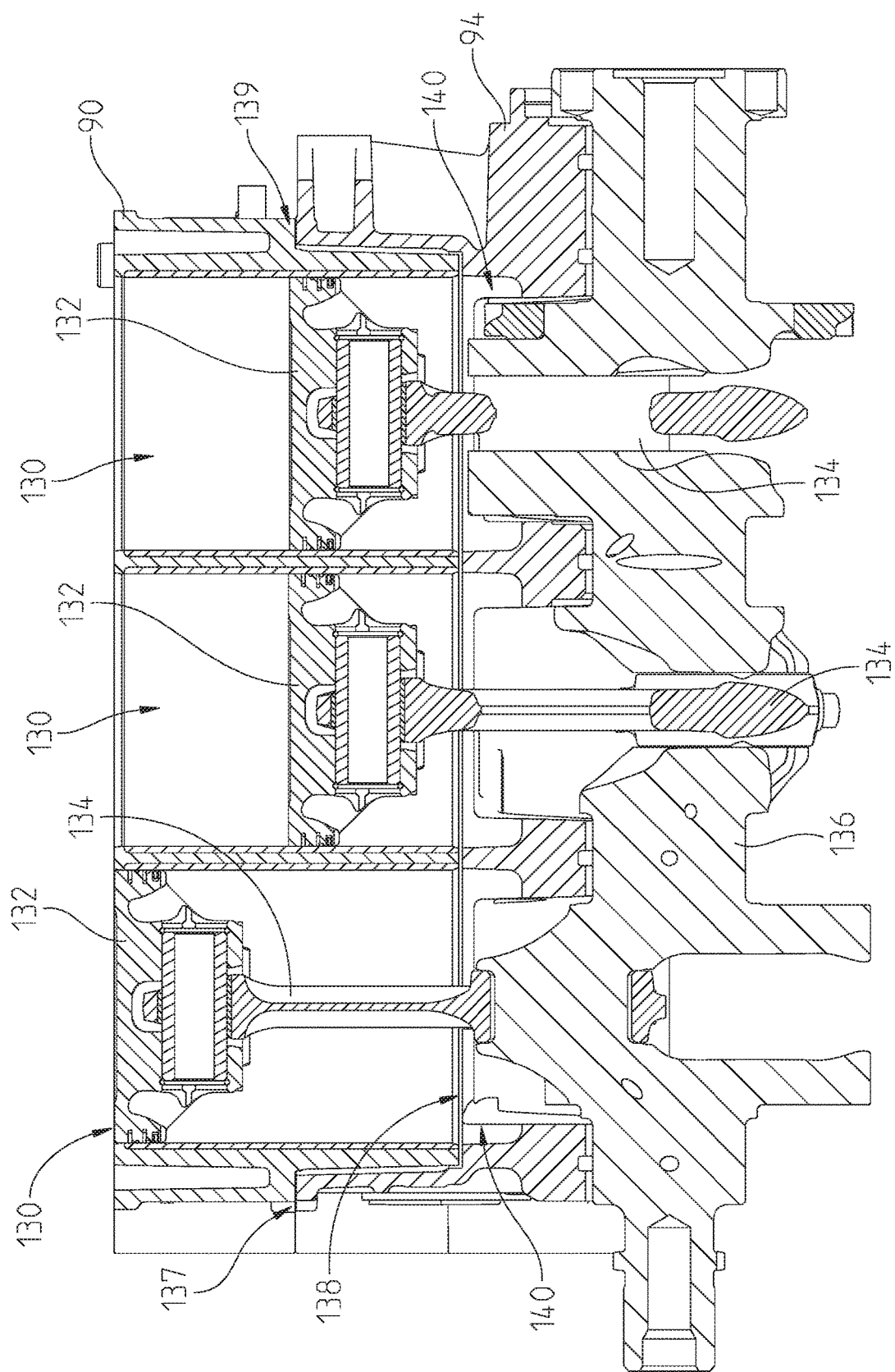
FIG. 15 shows a cross-sectional view of a portion of the engine of FIG. 13 taken along line 15-15 of FIG. 13.

With reference now to FIGS. 13-15, engine 72 generally includes a plurality of cylinders 130, illustratively three but any number of cylinders 130 may be provided, a piston 132 positioned within each cylinder 130, and a connecting rod 134 coupling each piston 132 to a crankshaft 136. Cylinders 130 are generally positioned within cylinder block 90 which is sealingly coupled to and positioned above first crankcase portion 94 with a gasket 138. In various embodiments, gasket 138 is configured such that each cylinder 130 is individually sealed with first crankcase portion 94 at a lowermost end of cylinder block 90. In various embodiments, cylinder block 90 may be sealingly coupled above first crankcase portion 94 with an additional gasket 137 positioned above gasket 138 and between an uppermost end of first crankcase portion 94 and a lip 139 of cylinder block 90. In this way, each cylinder 130 is sealed from each other such that fluid does not flow between cylinders 130.

Crankshaft 136 is generally positioned within first and second crankcase portions 94 and 96, and connecting rods 134 reciprocate within crank bays 140 within first and second crankcase portions 94 and 96 and cylinders 130. Gasket 138 seals individual crank bays 140 to prevent windage created by the reciprocation of connecting rods 134 within crank bays 140 from passing between crank bays 140.

Referring now to FIGS. 16-19, engine 72 may further include a balance shaft 150 and a starter motor 152 for cranking or starting engine 72. In various embodiments, starter motor 152 and balance shaft 150 are coupled to crankshaft 136 such that crankshaft 136 is started by balance shaft 150. For example, and as shown in FIGS. 16-19, crankshaft 136 may be started by balance shaft 150 via a gear assembly 153. Gear assembly 153 generally includes a starter gear 156 coupled to a first end 151 of starter motor 152 which is meshed with a first transfer gear 158 coupled to a shaft 157, which extends between first crankcase portion 94 and a cover 159 (FIG. 13) coupled to first crankcase portion 94. First transfer gear 158 in turn is fixedly coupled to a second transfer gear 160 (FIGS. 18 and 19) which may also be coupled to shaft 157 and positioned between first crankcase portion 94 and cover 159. In this way, gears 158, 160 may rotate together on shaft 157 such that when starter motor 152 drives gear 158, gear 160 drives rotation of a gear 162, as disclosed further herein. In various embodiments, first transfer gear 150 is a torque limiting gear that limits any backfire torque engine 72 sees. Second transfer gear 160 in turn is meshed with an outer gear 162 of balance shaft 150 which is coupled to an inner gear 164 of balance shaft 150 via a one-way or sprag clutch such that outer gear 162 is fixedly coupled to inner gear 164 in a first direction and rotatably coupled to inner gear 164 in a second direction. Inner gear 164 of balance shaft 150, which is fixedly coupled to balance shaft 150, in turn is meshed with a gear 166 of crankshaft 136. In this way, crankshaft 136 may be started by balance shaft 150 via gear assembly 153.

Figure 16:
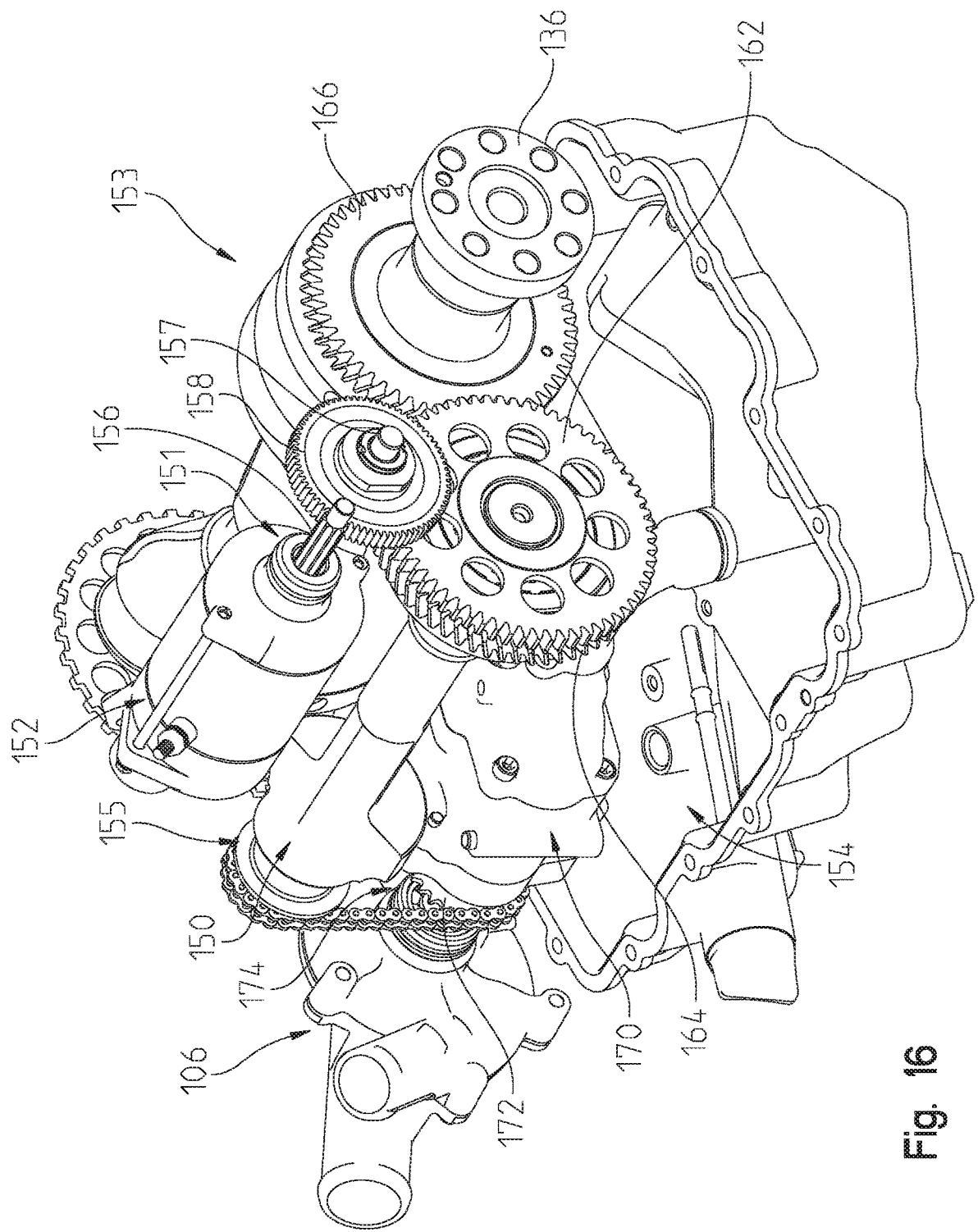
FIG. 16 shows a perspective view of a starter motor, a balance shaft, an oil pump, a water pump, a crankshaft and an oil pan of the engine of FIG. 9.
Figure 17:
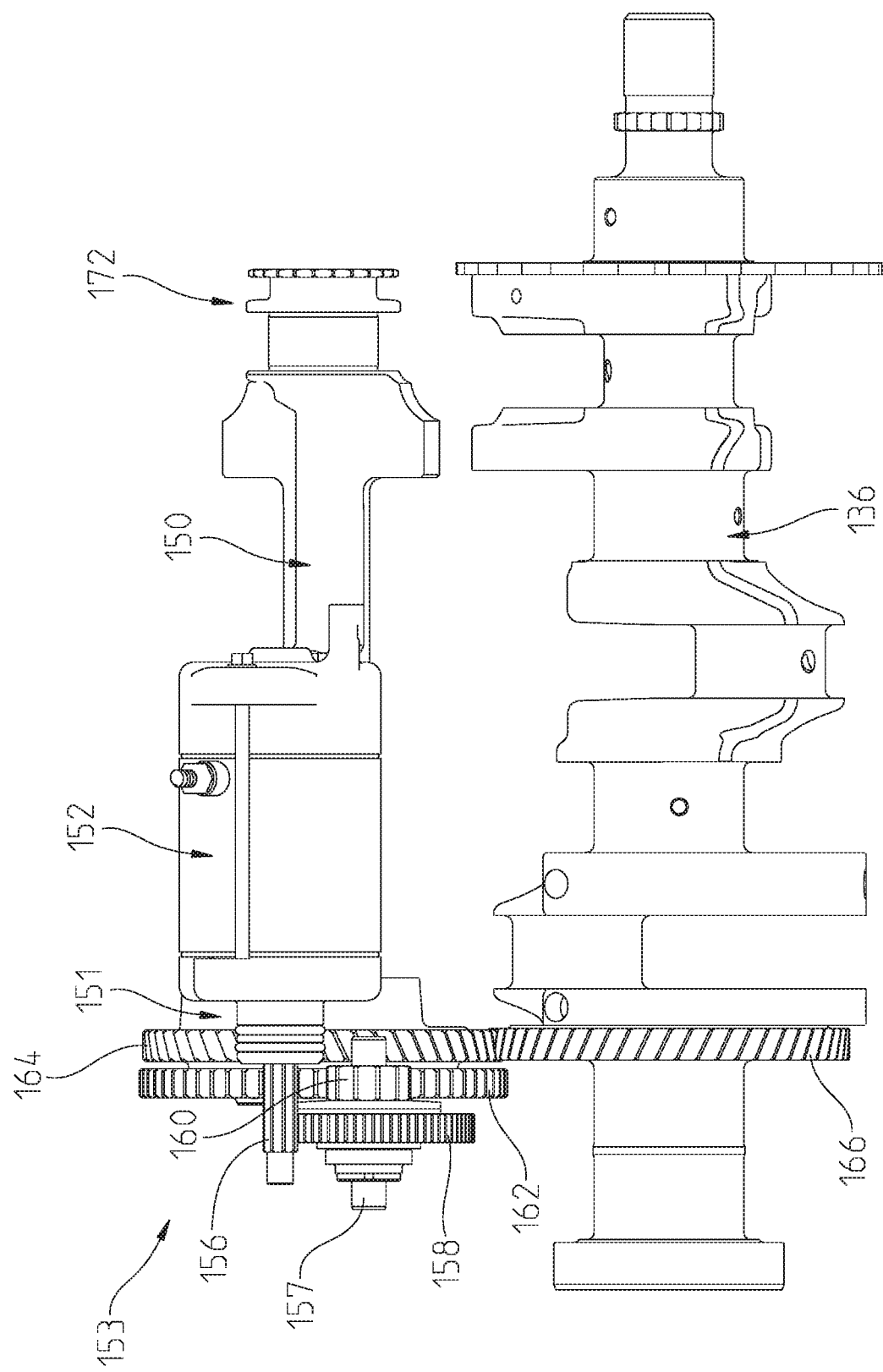
FIG. 17 shows a side plan view of the starter motor, the balance shaft, and the crankshaft of FIG. 16.
Figure 18:
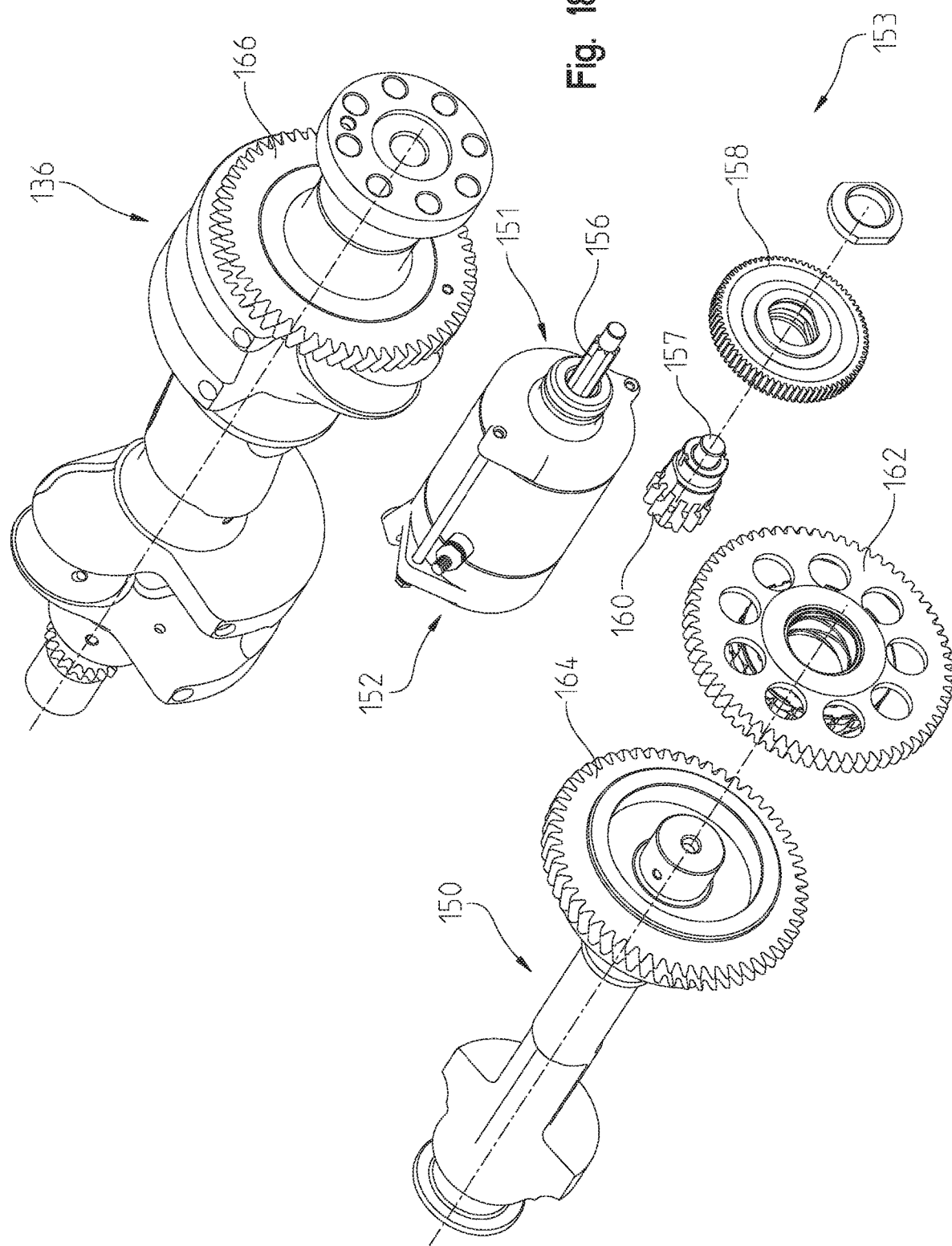
FIG. 18 shows an exploded view of the starter motor, the balance shaft, and the crankshaft of FIG. 17.
Figure 19:
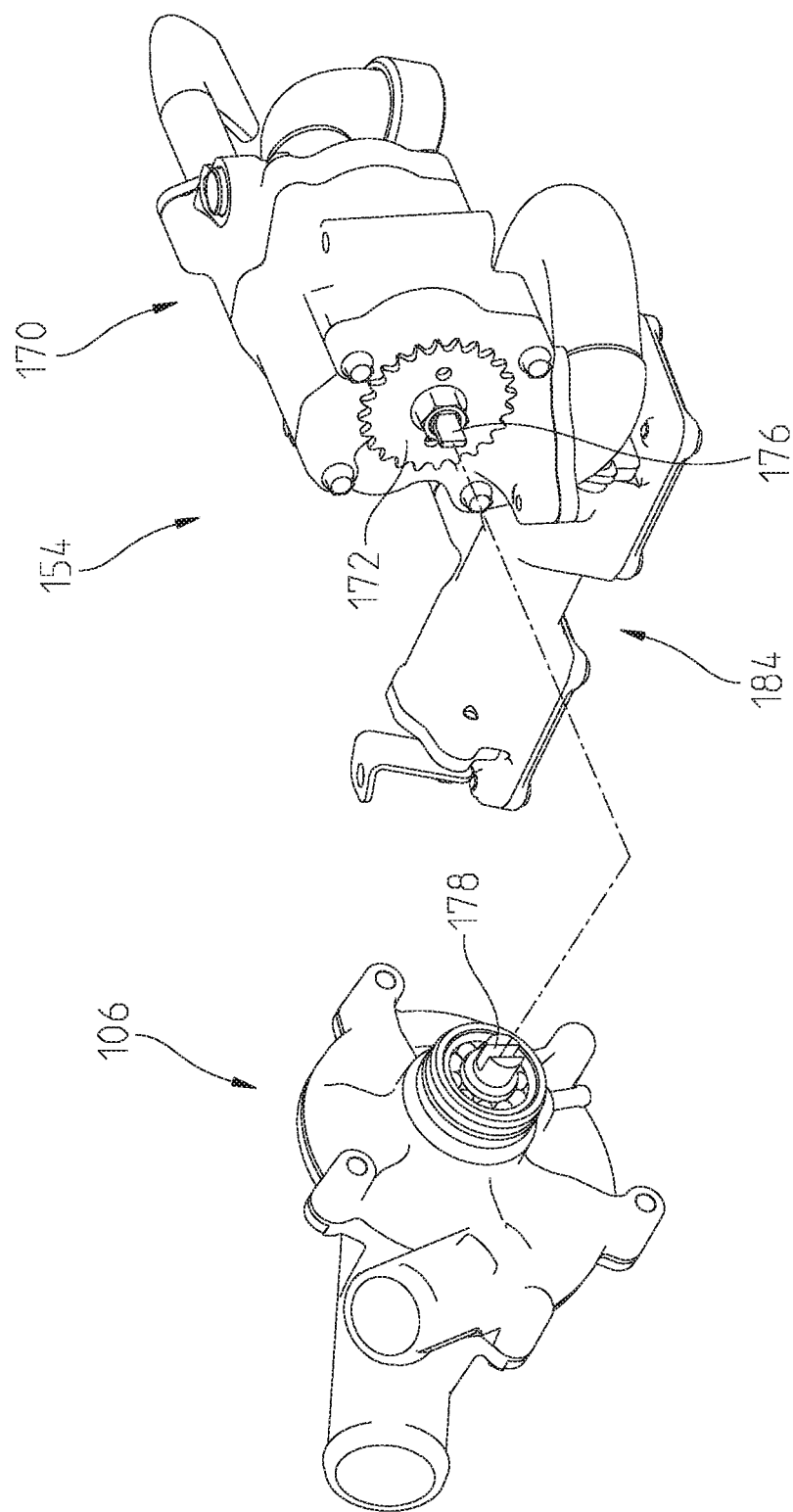
FIG. 19 shows an exploded view of the water pump and the oil pump of FIG. 16.
Figure 20:
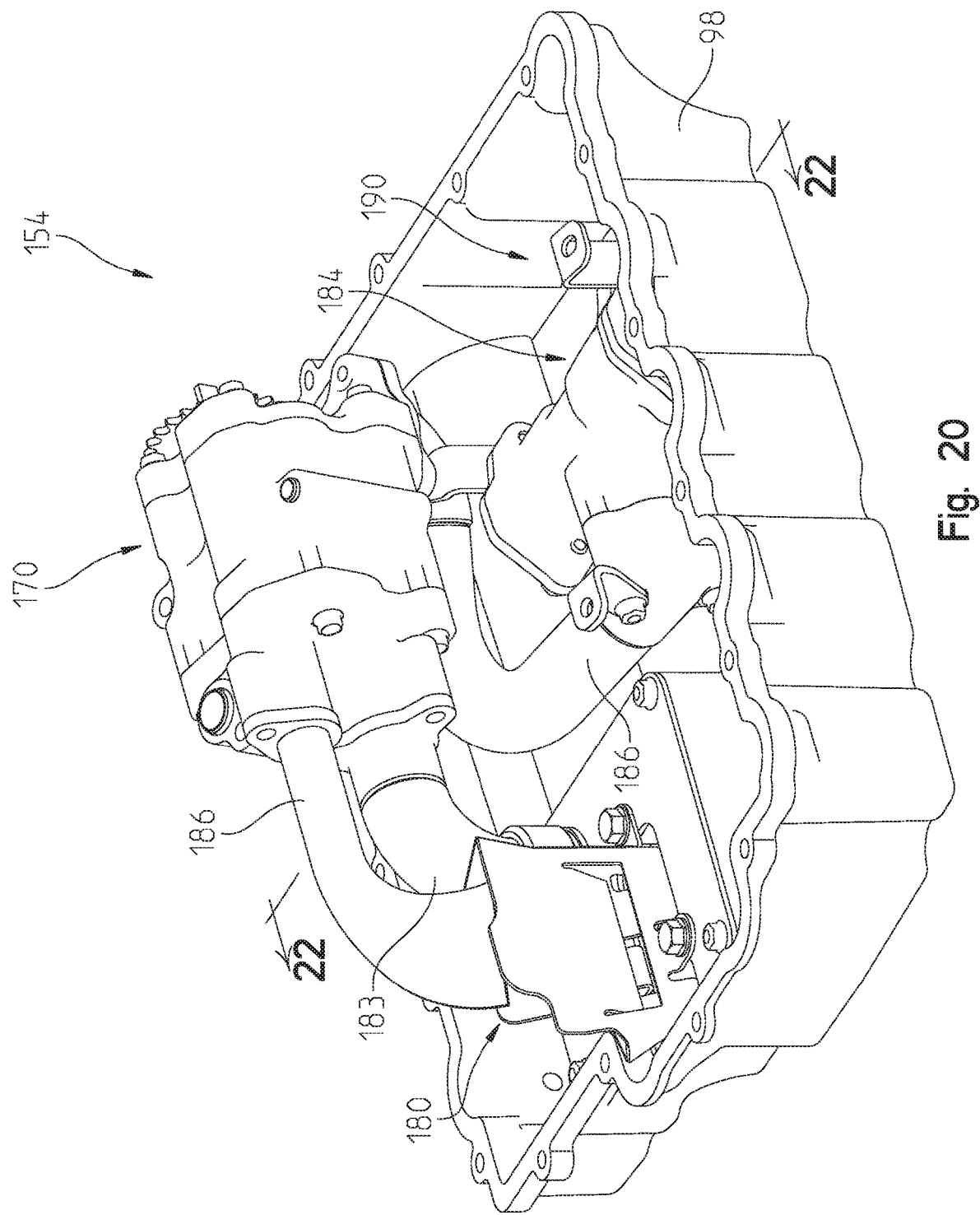
FIG. 20 shows a perspective view of a lubrication system of the engine of FIG. 9.
Figure 21:
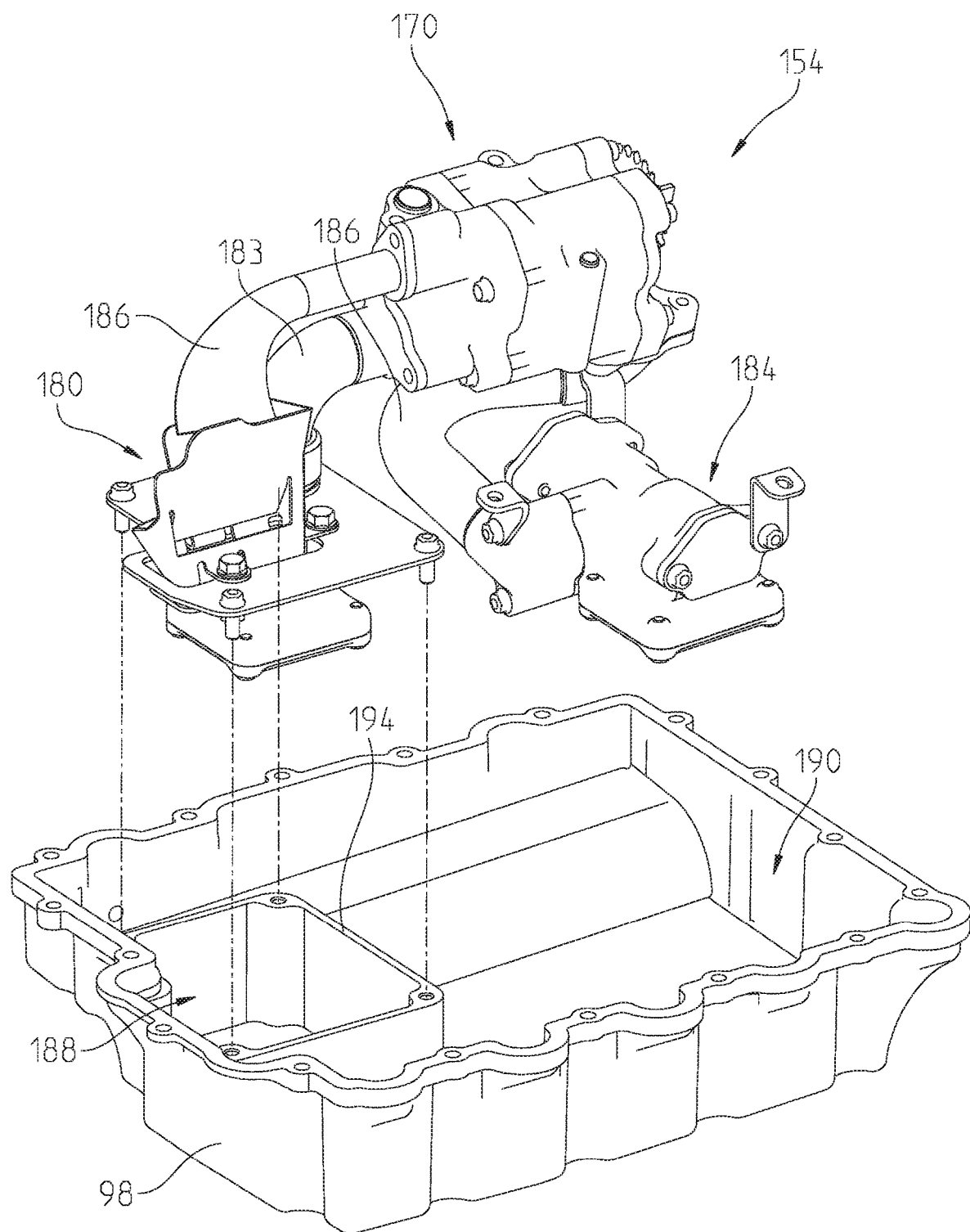
FIG. 21 shows an exploded view of the lubrication system of FIG. 20.

With reference to FIGS. 16 and 19, engine 72 generally further includes a lubrication assembly 154 coupled to balance shaft 150 such that balance shaft 150 drives an oil pump 170 of lubrication assembly 154. For example, and as shown in FIG. 16, a second end 155 of balance shaft 150 may be coupled to a gear 172 of oil pump 170 via a chain 174 such that rotation of balance shaft 150 drives oil pump 170. In various embodiments, oil pump 170 is coupled directly to water pump 106 such that rotation of gear 172 of oil pump 170 drives water pump 106. For example, and as shown in FIG. 19, oil pump 170 may include a protrusion or key 176 fixedly coupled to gear 172 which is received within an indentation or opening 178 in water pump 106 such that rotation of protrusion 176 is transferred to water pump 106 through indentation 178.

Referring to FIGS. 19-23B, lubrication system 154 generally further includes a pressure pick-up 180 fluidly coupled to oil pump 170 via a transfer conduit 182, and a scavenge pump 184 fluidly coupled to oil pump 170 via a pickup conduit 186, where pressure pick-up 180 and scavenge pump 184 are positioned within oil pan 98. Oil pan 98 generally includes a pressure pick-up volume 188 (FIG. 21) within which pressure pick-up 180 is positioned and into which oil from oil pump 170 may be released through oil pump outlet conduit 183, a scavenge pump volume 190 within which scavenge pump 184 is positioned, and an outlet 192 through which oil within oil pan 98 may be drained. In various embodiments, outlet 192 may be positioned such that oil from pressure pick-up volume 188 and scavenge pump volume 190 may be drained simultaneously. For example, outlet 192 may be positioned below a wall 194 of pressure pick-up volume 188 such that a portion of outlet 192 is in fluid communication with pressure pick-up volume 188 and a portion of outlet 192 is in fluid communication with scavenge pump volume 190.

Figure 22:
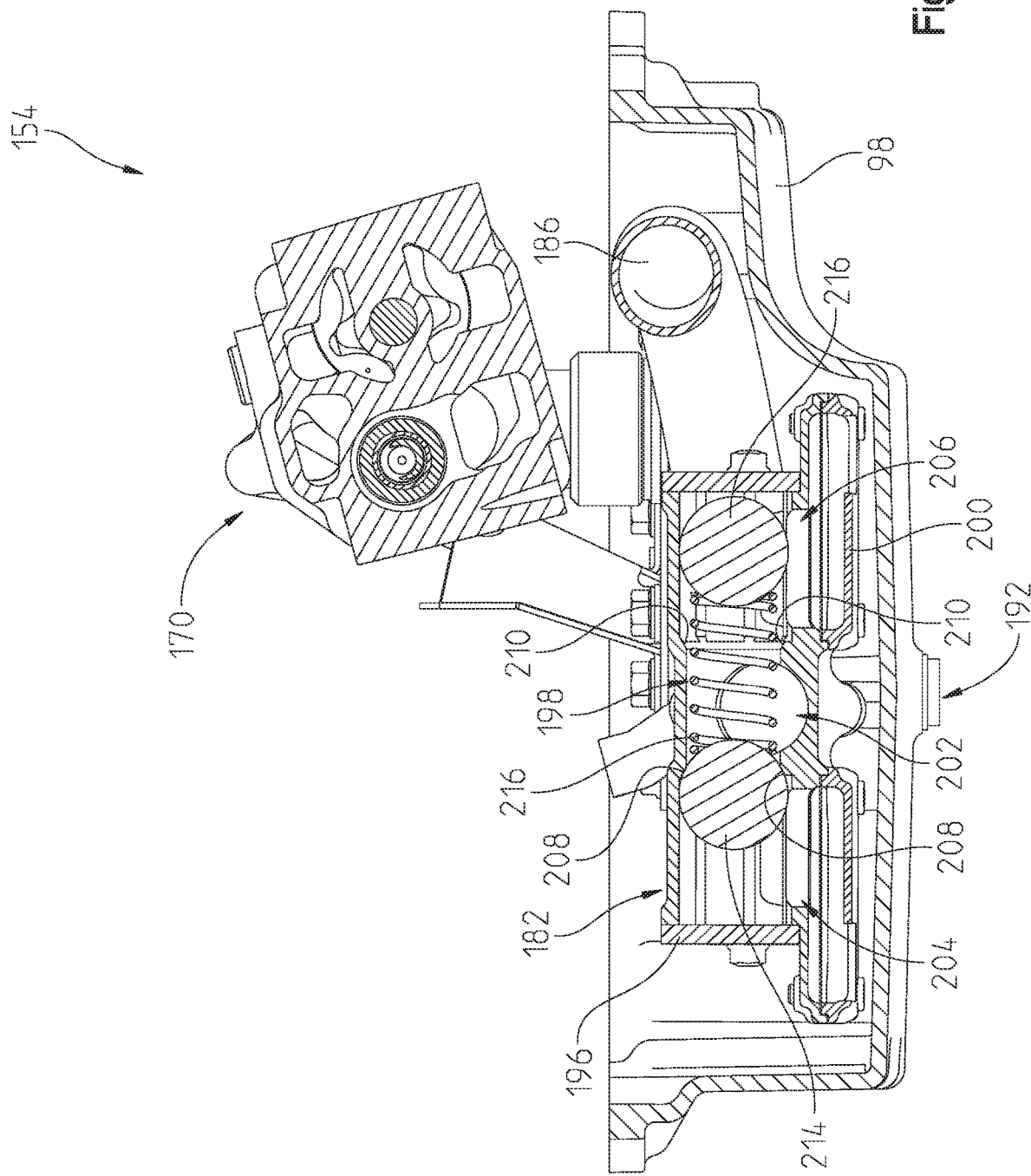
FIG. 22 shows a cross-sectional view of lubrication system of FIG. 20 taken along line 22-22 of FIG. 20.
Figure 23A:
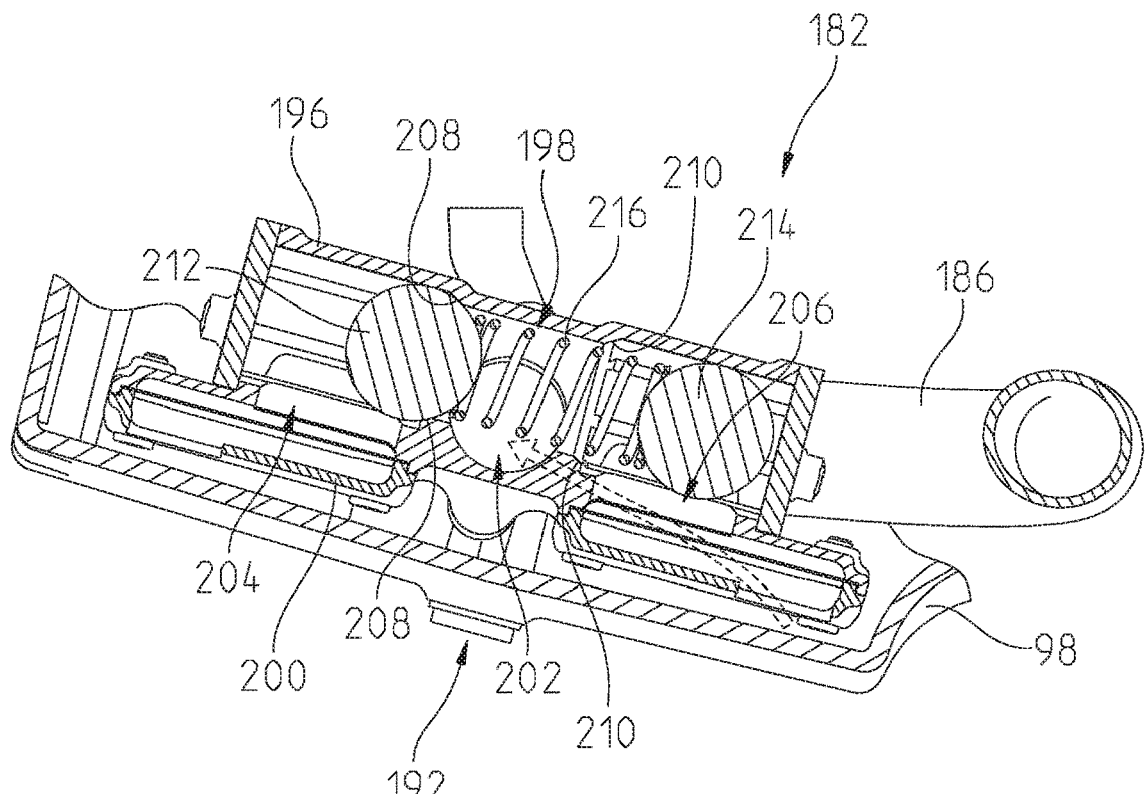
FIG. 23A is a detailed cross-sectional view of a scavenge pump of the lubrication system of FIG. 22 when the vehicle of FIG. 1 is tilted in a first direction.
Figure 23B:
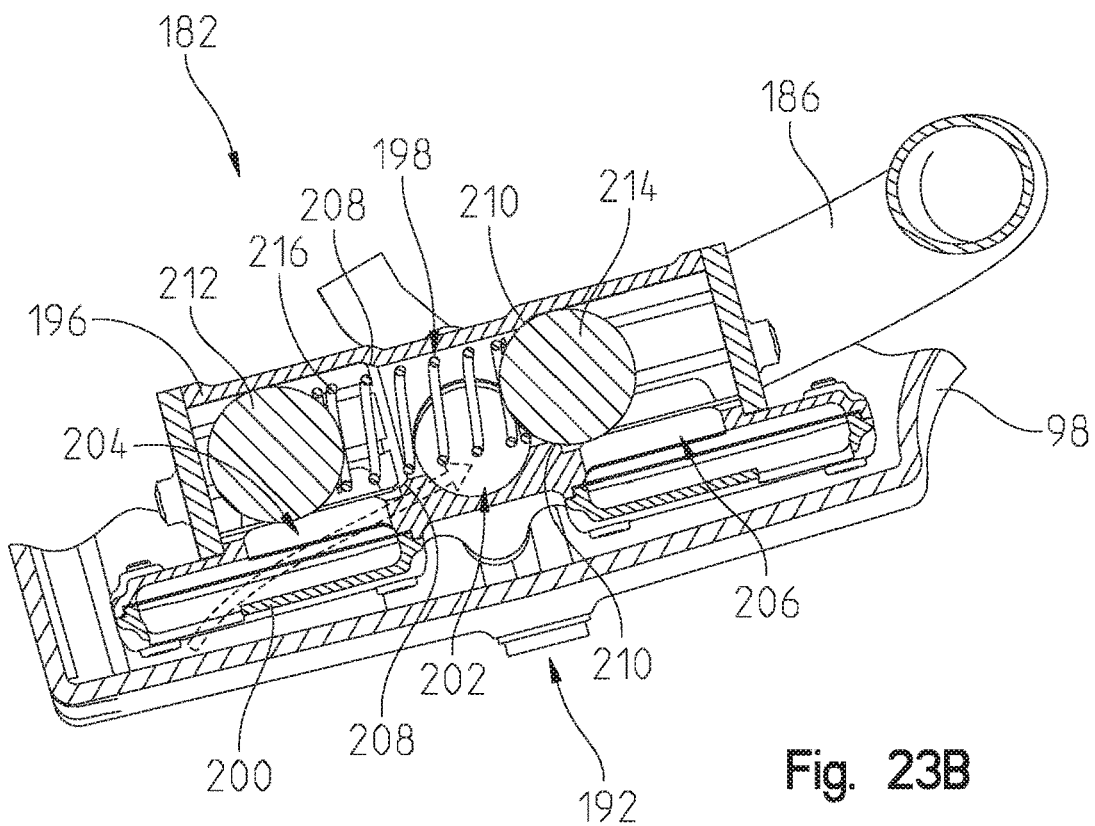
FIG. 23B shows a detailed cross-sectional view of the scavenge pump of the lubrication system of FIG. 22 when the vehicle of FIG. 1 is tilted in a second direction.

Referring to FIGS. 22, 23A, and 23B, in various embodiments, scavenge pump 184 is a shuttle valve scavenge pump 184. Shuttle valve scavenge pump 184 generally includes a housing 196, a shuttle valve assembly 198 positioned with housing 196, and a strainer assembly 200 coupled to housing 196. Housing 196 includes an outlet 202 fluidly coupled to oil pump 170 via pick up conduit 186, a first inlet 204 fluidly coupled to strainer assembly 200, a second inlet 206 fluidly coupled to strainer assembly 200, a first shoulder 208, and a second shoulder 210. Shuttle valve assembly 198 generally includes at least one ball 212 and/or 214 positioned within housing 196. In various embodiments, and as shown in the illustrative embodiments, shuttle valve assembly 198 may include a first ball 212, a second ball 214, and a spring 216 positioned between first ball 212 and second ball 214. Strainer assembly 200 generally includes a first inlet 215 in fluid communication with first inlet 204 of housing 196 and a second inlet 217 in fluid communication with second inlet 206 of housing 196.

Shuttle valve assembly 198 is configured to shift within housing 196 such that when vehicle 2 is tilted in a first direction (e.g., to one side), gravity causes the at least one ball 212 and/or 214 to prevent first inlet 215 of strainer assembly 200 and first inlet 204 of housing 196 from fluidly communicating with outlet 202 and/or oil pump 170 such that oil is received through second inlet 206 of housing 196 and second inlet 217 of strainer assembly 200. Additionally, when vehicle 2 is tilted in a second direction opposite to the first direction (e.g., to the other side), gravity causes the at least one ball 212 and/or 214 to prevent second inlet 206 of housing 196 and second inlet 217 of strainer assembly 200 from fluidly communication with outlet 202 and/or oil pump 170 such that oil is received through first inlet 215 of strainer assembly 200 and first inlet 204 of housing 196. With reference to the illustrative embodiments, when vehicle 2 is tilted in the first direction, gravity causes first ball 212 to abut first shoulder 208 such that first inlet 204 of housing 196 and first inlet 215 of strainer assembly 200 are no longer in fluid communication with outlet 202 and oil pump 170 and oil is received through second inlet 206 of housing 196 and second inlet 217 of strainer assembly 200 (FIG. 23A), while when vehicle 2 is tilted in the second direction opposite to the first direction, gravity causes second ball 214 to abut second should 210 such that second inlet 206 of housing 196 and second inlet 217 of strainer assembly 200 are no longer in fluid communication with outlet 170 and oil pump 170 and oil is received through first inlet 204 of housing 196 and first inlet 215 of strainer assembly 200 (FIG. 23B). When vehicle 2 is not tilted in either direction, the at least one ball, illustratively first ball 212 and second ball 214, may be spaced apart from first and second shoulders 208 and 210 such that oil may be received through both first and second inlets 204 and 206 of housing 196 and first and second inlets 215 and 217 of strainer assembly 200 simultaneously. However, spring 216 prevents first ball 212 and second ball 214 from being simultaneously engaged with first and second shoulder 208 and 210, respectively, such that oil is being received through one of inlets 204 and 215 or inlets 206 and 217 at any given time. As such, shuttle valve assembly 198 prevents air from being received within scavenge pump184 when vehicle 2 is tilted.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A utility vehicle, comprising:
   a frame;
   a body supported by the frame;
   a seating area supported by the frame; front and rear ground engaging members supporting the frame and the body; and
   a powertrain drivingly coupled to the front and rear ground engaging members, the powertrain including an engine having a cylinder block having a plurality of cylinders, a cylinder head removably coupled to the cylinder block, a crankcase having a first portion and a second portion, the first portion of the crankcase being removably coupled to the cylinder block, and at least one gasket positioned between the cylinder block and the first portion of the crankcase, the at least one gasket configured to individually seal each of the plurality of cylinders relative to the first portion of the crankcase, wherein the at least one gasket includes a first gasket and a second gasket, both of which are positioned between the cylinder block and the first portion of the crankcase, the first gasket being positioned below the plurality of cylinders and the second gasket being positioned above the first gasket and positioned above a portion of the plurality of cylinders.

2. The utility vehicle of claim 1, wherein the engine further includes a plurality of pistons positioned within the plurality of cylinders and a plurality of connecting rods coupling the plurality of pistons to a crankshaft of the engine.

3. The utility vehicle of claim 2, wherein the crankcase includes a plurality of crank bays within which the plurality of connecting rods reciprocates, and each of the plurality of connecting rods is positioned within one of the plurality of cylinders and one of the plurality of crank bays at all crank angles.

4. The utility vehicle of claim 2, wherein the first gasket is positioned adjacent a lowermost end of the cylinder block and the second gasket is positioned adjacent an uppermost end of the first portion of the crankcase.

5. An engine for a utility vehicle, comprising:
a cylinder block having a plurality of cylinders, the cylinder block having a lip and the plurality of cylinders extending downwardly relative to the lip;
a cylinder head removably coupled to the cylinder block; and
a crankcase having a first portion and a second portion, the first portion of the crankcase being removably coupled to the cylinder block, wherein each of the plurality of cylinders is individually sealed with the first portion of the crankcase via at least one sealing member positioned intermediate a bottom extent of the plurality of cylinders and the crankcase.

6. The engine of claim 5, wherein the engine further includes a plurality of pistons positioned within the plurality of cylinders and a plurality of connecting rods coupling the plurality of pistons to a crankshaft of the engine.

7. The engine of claim 6, wherein the crankcase includes a plurality of crank bays within which the plurality of connecting rods reciprocates, and each of the plurality of connecting rods is positioned within one of the plurality of cylinders and one of the plurality of crank bays at all crank angles.

8. The engine of claim 1, wherein the first gasket is positioned at a bottommost extent of the cylinder block.

9. The engine of claim 1, wherein the first gasket is positioned between a bottommost extent of the plurality of cylinders and the crankcase and the second gasket is positioned between a lip of the cylinder block and the crankcase.

10. The engine of claim 1, wherein the second gasket extends further laterally outwardly from the plurality of pistons than the first gasket.

11. The engine of claim 1, wherein the cylinder block has a lip, and the plurality of cylinders extend outwardly from the lip, and the first gasket is positioned at a bottom extent of the plurality of cylinders and the second gasket is positioned adjacent the lip.

12. The engine of claim 1, wherein the first gasket and the second gasket are vertically separated.

13. The engine of claim 1, wherein the second gasket surrounds multiple cylinders of the cylinder block and the first gasket surrounds a single cylinder of the cylinder block.

14. The engine of claim 1, wherein the second gasket is completely above the crankcase and the first gasket is below an upper extent of the crankcase.

15. The engine of claim 5, wherein the at least one sealing member includes a first sealing member and a second sealing member, the second sealing member being positioned radially about a portion of the cylinders of the cylinder block.

16. The engine of claim 15, wherein the second sealing member is positioned between the lip of the cylinder block and the crankcase.

17. The engine of claim 5, wherein the at least one sealing member comprises a first sealing member and a second sealing member, and one of the first sealing member and the second sealing member surrounds multiple cylinders and the other of the first sealing member and the second sealing member surrounds a single cylinder.

* * * * *